(12) United States Patent
Morey et al.

(10) Patent No.: US 11,079,309 B2
(45) Date of Patent: Aug. 3, 2021

(54) STRENGTHENED GLASS ARTICLES HAVING IMPROVED SURVIVABILITY

(71) Applicant: Corning Incorporated, Corning, NY (US)

(72) Inventors: Laurence Ralph Morey, Painted Post, NY (US); Jonathan David Pesansky, Corning, NY (US); Kevin Barry Reiman, Horseheads, NY (US); Benjamin Allen Stevens, Painted Post, NY (US); Brian Paul Strines, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 152 days.

(21) Appl. No.: 14/340,670

(22) Filed: Jul. 25, 2014

(65) Prior Publication Data

US 2015/0030834 A1    Jan. 29, 2015

Related U.S. Application Data

(60) Provisional application No. 61/943,758, filed on Feb. 24, 2014, provisional application No. 61/858,882, filed on Jul. 26, 2013.

(51) Int. Cl.
*C03C 21/00* (2006.01)
*G01N 3/30* (2006.01)
(Continued)

(52) U.S. Cl.
CPC ............. *G01N 3/30* (2013.01); *C03C 3/091* (2013.01); *C03C 3/093* (2013.01); *C03C 3/097* (2013.01);
(Continued)

(58) Field of Classification Search
CPC ...... G01N 3/30; G01N 3/303; C03C 10/0018; C03C 10/0027; C03C 10/0036;
(Continued)

(56) References Cited

U.S. PATENT DOCUMENTS 1,960,121 A   5/1934   Moulton
3,107,196 A   10/1963  Paul
(Continued)

FOREIGN PATENT DOCUMENTS

AU   6452265 A      10/1965
AU   2011212982 A1   8/2012
(Continued)

OTHER PUBLICATIONS

Aegerter et al "Sol-gel technologies for glass producers and users—Chapter 4.1.8—Scratch resistant coatings (G. Helsch and G. H. Frischat)", pp. 217-221, Kluwer Academic Publishers, 2004.
(Continued)

*Primary Examiner* — Maria V Ewald
*Assistant Examiner* — Ethan A. Utt
(74) *Attorney, Agent, or Firm* — Timothy M. Schaeberle; Jeffrey A. Schmidt

(57) ABSTRACT

Embodiments are directed to strengthened glass articles comprising a thickness $t \leq 1$ mm (1000 µm), an inner region under a central tension CT (in MPa), and at least one compressive stress layer adjacent the inner region and extending within the strengthened glass article from a surface of the strengthened glass article to a depth of layer DOL (in µm), wherein the strengthened glass article is under a compressive stress at the surface $CS_s$ (in MPa), wherein the strengthened glass article is an alkali aluminosilicate glass article comprising 0-5 mol % $Li_2O$, and at least 3 mol % $Al_2O_3$, and wherein the DOL$\geq$70 µm, and a $CS_s$/DOL ratio$\geq$2.5 MPa/µm.

50 Claims, 13 Drawing Sheets

(51) Int. Cl.
  *C03C 3/093* (2006.01)
  *C03C 3/097* (2006.01)
  *C03C 3/091* (2006.01)

(52) U.S. Cl.
  CPC ......... *C03C 21/002* (2013.01); *Y10T 428/315* (2015.01)

(58) Field of Classification Search
  CPC . C03C 10/0045; C03C 21/001; C03C 21/002; C03C 21/00; C03C 10/00; C03C 3/00; C03C 3/076; C03C 3/078; C03C 3/083; C03C 3/085; C03C 3/087; C03C 3/089; C03C 3/091; C03C 3/093; C03C 3/095; C03C 3/097; Y10T 428/31; Y10T 428/315; Y10T 428/24942; Y10T 428/2495; Y10T 428/24967; Y10T 428/24975; Y10T 428/26; Y10T 428/266; Y10T 428/268; B32B 17/00; B32B 17/06
  USPC ....... 73/12.06; 428/409, 410, 426, 428, 212, 428/213, 215–220, 332, 337, 338; 65/30.1, 30.13, 30.14; 501/11, 27, 53, 501/55, 63–70, 72
  See application file for complete search history.

(56) References Cited

U.S. PATENT DOCUMENTS

| | | |
|---|---|---|
| 3,287,200 A | 11/1966 | Hess et al. |
| 3,357,876 A | 12/1967 | Welling |
| 3,380,818 A | 4/1968 | Smith |
| 3,404,015 A | 9/1968 | Dumbaugh, Jr. |
| 3,410,673 A | 11/1968 | Marusak |
| 3,433,611 A | 3/1969 | Saunders et al. |
| 3,464,880 A | 9/1969 | Rinehart |
| 3,489,097 A | 1/1970 | Gemeinhardt |
| 3,490,984 A | 1/1970 | Petticrew et al. |
| 3,625,718 A | 12/1971 | Petticrew |
| 3,639,198 A | 1/1972 | Plumat et al. |
| 3,656,923 A | 4/1972 | Garfinkel et al. |
| 3,660,060 A | 5/1972 | Spanoudis |
| 3,673,049 A | 6/1972 | Giffen et al. |
| 3,737,294 A | 6/1973 | Dumbaugh et al. |
| 3,746,526 A | 7/1973 | Giffon |
| 3,765,855 A | 10/1973 | Larrick |
| 3,798,013 A | 3/1974 | Inoue et al. |
| 3,811,855 A | 5/1974 | Stockdale et al. |
| 3,844,754 A | 10/1974 | Grubb et al. |
| 3,879,183 A | 4/1975 | Carlson |
| 3,907,577 A | 9/1975 | Kiefer et al. |
| 3,931,438 A | 1/1976 | Beall et al. |
| 3,936,287 A | 2/1976 | Beall et al. |
| 3,958,052 A | 5/1976 | Galusha et al. |
| 3,959,000 A | 5/1976 | Nakagawa et al. |
| 4,042,405 A | 8/1977 | Krohn et al. |
| 4,053,679 A | 10/1977 | Rinehart |
| 4,055,703 A | 10/1977 | Rinehart |
| 4,102,664 A | 7/1978 | Dumbaugh, Jr. |
| 4,130,437 A | 12/1978 | Mazeau et al. |
| 4,148,661 A | 4/1979 | Kerko et al. |
| 4,156,755 A | 5/1979 | Rinehart |
| 4,190,451 A | 2/1980 | Hares et al. |
| 4,214,886 A | 7/1980 | Shay et al. |
| 4,240,836 A | 12/1980 | Borrelli et al. |
| 4,242,117 A | 12/1980 | Van Ass |
| 4,358,542 A | 11/1982 | Hares et al. |
| 4,407,966 A | 10/1983 | Kerko et al. |
| 4,468,534 A | 8/1984 | Boddicker |
| 4,471,024 A | 9/1984 | Pargamin et al. |
| 4,483,700 A | 11/1984 | Forker et al. |
| 4,537,612 A | 8/1985 | Borrelli et al. |
| 4,608,349 A | 8/1986 | Kerko et al. |
| 4,702,042 A | 10/1987 | Herrington et al. |
| 4,726,981 A * | 2/1988 | Pierson et al. ............. 428/212 |
| 4,736,981 A | 4/1988 | Barton et al. |
| 4,757,162 A | 7/1988 | Dumora et al. |
| 4,857,485 A | 8/1989 | Brennan et al. |
| 5,270,269 A | 12/1993 | Hares et al. |
| 5,273,827 A | 12/1993 | Francis |
| 5,322,819 A | 6/1994 | Araujo et al. |
| 5,342,426 A | 8/1994 | Dumbaugh, Jr. |
| 5,350,607 A | 9/1994 | Tyson et al. |
| 5,559,060 A | 9/1996 | Dumbaugh et al. |
| 5,763,343 A | 6/1998 | Brix et al. |
| 5,773,148 A | 6/1998 | Charrue et al. ............. 428/410 |
| 5,804,317 A | 9/1998 | Charrue |
| 5,895,768 A | 4/1999 | Speit |
| 5,972,460 A | 10/1999 | Tachiwana |
| 6,111,821 A | 8/2000 | Bach |
| 6,187,441 B1 | 2/2001 | Takeuchi et al. |
| 6,333,286 B1 | 12/2001 | Kurachi et al. |
| 6,376,402 B1 | 4/2002 | Pannhorst et al. |
| 6,413,892 B1 | 7/2002 | Koyama et al. |
| 6,440,531 B1 | 8/2002 | Kurachi et al. |
| 6,472,068 B1 | 10/2002 | Glass et al. |
| 6,516,634 B1 | 2/2003 | Green et al. |
| 6,518,211 B1 | 2/2003 | Bradshaw et al. |
| 6,528,440 B1 | 3/2003 | Vilato et al. |
| 6,537,938 B1 | 3/2003 | Miyazaki |
| 6,607,999 B2 | 8/2003 | Hachitani |
| 6,689,704 B2 | 2/2004 | Ota et al. |
| 6,846,760 B2 | 1/2005 | Siebers et al. |
| 7,007,512 B2 | 3/2006 | Kamada et al. |
| 7,091,141 B2 | 8/2006 | Horsfall et al. |
| 7,176,528 B2 | 2/2007 | Couillard et al. |
| 7,476,633 B2 | 1/2009 | Comte et al. |
| 7,514,149 B2 | 4/2009 | Bocko et al. |
| 7,531,475 B2 | 5/2009 | Kishimoto et al. |
| 7,619,283 B2 | 11/2009 | Gadkaree |
| 7,666,511 B2 | 2/2010 | Ellison et al. |
| 7,687,419 B2 | 3/2010 | Kawai |
| 7,727,917 B2 | 5/2010 | Shelestak et al. |
| 7,838,136 B2 | 11/2010 | Nakashima et al. |
| 7,891,212 B2 | 2/2011 | Isono |
| 8,007,913 B2 | 8/2011 | Coppola et al. |
| 8,075,999 B2 | 12/2011 | Barefoot et al. |
| 8,099,982 B2 | 1/2012 | Takagi et al. |
| 8,143,179 B2 | 3/2012 | Aitken et al. |
| 8,158,543 B2 | 4/2012 | Dejneka et al. |
| 8,193,128 B2 | 6/2012 | Hellmann et al. |
| 8,232,218 B2 | 7/2012 | Dejneka et al. |
| 8,252,708 B2 | 8/2012 | Morena et al. |
| 8,312,739 B2 | 11/2012 | Lee et al. |
| 8,312,789 B2 | 11/2012 | Beck |
| 8,327,666 B2 | 12/2012 | Harvey et al. |
| 8,347,651 B2 | 1/2013 | Abramov et al. |
| 8,349,455 B2 | 1/2013 | Kondo et al. |
| 8,415,013 B2 | 4/2013 | Barefoot et al. |
| 8,431,502 B2 | 4/2013 | Dejneka et al. |
| 8,561,429 B2 | 10/2013 | Allan et al. |
| 8,580,411 B2 | 11/2013 | Endo et al. |
| 8,586,492 B2 | 11/2013 | Barefoot et al. |
| 8,623,776 B2 | 1/2014 | Dejneka et al. |
| 8,652,978 B2 | 2/2014 | Dejneka et al. |
| 8,656,734 B2 | 2/2014 | Zou et al. |
| 8,691,711 B2 | 4/2014 | Nakashima et al. |
| 8,697,592 B2 | 4/2014 | Ikenishi et al. |
| 8,713,972 B2 | 5/2014 | Lakota et al. |
| 8,756,262 B2 | 6/2014 | Zhang |
| 8,759,238 B2 | 6/2014 | Chapman et al. |
| 8,765,262 B2 | 6/2014 | Gross |
| 8,778,820 B2 | 7/2014 | Gomez et al. |
| 8,783,063 B2 | 7/2014 | Osakabe et al. |
| 8,802,581 B2 | 8/2014 | Dejneka et al. |
| 8,854,623 B2 | 10/2014 | Fontaine et al. |
| 8,932,510 B2 | 1/2015 | Li et al. |
| 8,943,855 B2 | 2/2015 | Gomez et al. |
| 8,946,103 B2 | 2/2015 | Dejneka et al. |
| 8,950,215 B2 | 2/2015 | Rappoport et al. |
| 8,951,927 B2 | 2/2015 | Dejneka et al. |
| 8,957,374 B2 | 2/2015 | Liu et al. |
| 8,969,226 B2 | 3/2015 | Dejneka et al. |
| 8,975,374 B2 | 3/2015 | Kimura |

(56) References Cited

U.S. PATENT DOCUMENTS

| | | |
|---|---|---|
| 9,003,835 B2 | 4/2015 | Lock |
| 9,007,878 B2 | 4/2015 | Matsumoto et al. |
| 9,139,469 B2 | 9/2015 | Comte et al. |
| 9,140,543 B1 | 9/2015 | Allan et al. |
| 9,156,724 B2 | 10/2015 | Gross |
| 9,193,625 B2 | 11/2015 | Bookbinder et al. |
| 9,212,288 B2 | 12/2015 | Fujiwara et al. |
| 9,272,945 B2 | 2/2016 | Smith |
| 9,290,407 B2 | 3/2016 | Barefoot et al. |
| 9,290,413 B2 | 3/2016 | Dejneka et al. |
| 9,339,993 B2 | 5/2016 | Cites et al. |
| 9,346,703 B2 | 5/2016 | Bookbinder et al. |
| 9,359,251 B2 | 6/2016 | Bookbinder et al. |
| 9,487,434 B2 | 11/2016 | Amin et al. |
| 9,498,822 B2 | 11/2016 | Brandt et al. |
| 9,499,431 B2 | 11/2016 | Barefoot et al. |
| 9,567,254 B2 | 2/2017 | Amin et al. |
| 9,593,042 B2 | 3/2017 | Hu et al. |
| 9,604,876 B2 | 3/2017 | Gy et al. |
| 9,676,663 B2 | 6/2017 | Amin et al. |
| 9,701,569 B2 | 7/2017 | Demartino et al. |
| 9,751,802 B2 | 9/2017 | Allan et al. |
| 9,902,648 B2 | 2/2018 | Amin et al. |
| 9,908,810 B2 | 3/2018 | Amin et al. |
| 9,908,811 B2 | 3/2018 | Gross et al. |
| 9,977,470 B2 | 5/2018 | Demartino et al. |
| 10,118,858 B2 | 11/2018 | Amin et al. |
| 10,144,670 B2 | 12/2018 | Akatsuka et al. |
| 10,150,698 B2 | 12/2018 | Amin et al. |
| 10,160,688 B2 | 12/2018 | Amin et al. |
| 10,239,784 B2 | 3/2019 | Oram et al. |
| 2005/0090377 A1 | 4/2005 | Shelestak et al. |
| 2005/0099618 A1 | 5/2005 | Difoggio et al. |
| 2005/0221044 A1 | 10/2005 | Gaume et al. |
| 2005/0250639 A1 | 11/2005 | Siebers et al. |
| 2006/0127679 A1 | 6/2006 | Gulati et al. |
| 2006/0279217 A1 | 12/2006 | Peuchert et al. |
| 2007/0060465 A1 | 3/2007 | Varshneya et al. |
| 2007/0123410 A1 | 5/2007 | Morena et al. |
| 2007/0218262 A1 | 9/2007 | Degand et al. |
| 2008/0026927 A1 | 1/2008 | Monique Comte |
| 2008/0128953 A1 | 6/2008 | Nagai et al. |
| 2008/0241603 A1 | 10/2008 | Isono |
| 2008/0286548 A1 | 11/2008 | Ellison et al. |
| 2009/0142568 A1 | 6/2009 | Dejneka et al. |
| 2009/0197088 A1 | 8/2009 | Murata |
| 2009/0215607 A1 | 8/2009 | Dejneka et al. |
| 2009/0220761 A1 | 9/2009 | Dejneka et al. |
| 2010/0003508 A1 | 1/2010 | Arrouy et al. |
| 2010/0009154 A1* | 1/2010 | Allan ............ C03C 21/002 501/53 |
| 2010/0028607 A1* | 2/2010 | Lee et al. ................ 428/156 |
| 2010/0029460 A1 | 2/2010 | Shojiya et al. |
| 2010/0035038 A1* | 2/2010 | Barefoot ............ C03C 3/085 428/220 |
| 2010/0035745 A1 | 2/2010 | Murata |
| 2010/0087307 A1 | 4/2010 | Murata et al. |
| 2010/0112341 A1 | 5/2010 | Takagi et al. |
| 2010/0119846 A1 | 5/2010 | Sawada |
| 2010/0190038 A1 | 7/2010 | Osakabe et al. |
| 2010/0200804 A1 | 8/2010 | Woodruff et al. |
| 2010/0210422 A1 | 8/2010 | Crawford |
| 2010/0210442 A1 | 8/2010 | Abramov et al. |
| 2010/0215996 A1 | 8/2010 | Wendling et al. |
| 2010/0291353 A1 | 11/2010 | Dejneka et al. |
| 2010/0326657 A1 | 12/2010 | Hellmann et al. |
| 2011/0014475 A1 | 1/2011 | Murata |
| 2011/0064951 A1 | 3/2011 | Fujiwara et al. |
| 2011/0067447 A1 | 3/2011 | Zadesky et al. |
| 2011/0092353 A1 | 4/2011 | Amin et al. |
| 2011/0165393 A1 | 7/2011 | Bayne et al. |
| 2011/0201490 A1 | 8/2011 | Barefoot et al. |
| 2011/0226832 A1 | 9/2011 | Bayne et al. |
| 2011/0281093 A1 | 11/2011 | Gulati et al. |
| 2011/0293942 A1 | 11/2011 | Cornejo et al. |
| 2011/0294648 A1 | 11/2011 | Chapman et al. |
| 2011/0294649 A1 | 12/2011 | Gomez et al. |
| 2012/0015150 A1 | 1/2012 | Suzuki |
| 2012/0021898 A1 | 1/2012 | Elam et al. |
| 2012/0040146 A1 | 2/2012 | Garner et al. |
| 2012/0048604 A1 | 2/2012 | Cornejo et al. |
| 2012/0052271 A1* | 3/2012 | Gomez et al. ............. 428/213 |
| 2012/0052275 A1 | 3/2012 | Hashimoto et al. |
| 2012/0083401 A1 | 4/2012 | Koyama et al. |
| 2012/0114955 A1 | 5/2012 | Almoric et al. |
| 2012/0135153 A1 | 5/2012 | Osakabe et al. |
| 2012/0135226 A1* | 5/2012 | Bookbinder et al. ......... 428/335 |
| 2012/0171497 A1 | 7/2012 | Koyama et al. |
| 2012/0174497 A1 | 7/2012 | Kroes |
| 2012/0189843 A1 | 7/2012 | Chang et al. |
| 2012/0194974 A1 | 8/2012 | Weber et al. |
| 2012/0196110 A1 | 8/2012 | Murata et al. |
| 2012/0216569 A1 | 8/2012 | Allan et al. |
| 2012/0219792 A1 | 8/2012 | Yamamoto et al. .......... 428/336 |
| 2012/0236526 A1 | 9/2012 | Weber |
| 2012/0264585 A1 | 10/2012 | Ohara et al. |
| 2012/0297829 A1 | 11/2012 | Endo et al. |
| 2012/0308827 A1 | 12/2012 | Boek et al. |
| 2012/0321898 A1 | 12/2012 | Meinhardt et al. |
| 2013/0007458 A1 | 1/2013 | Wakita et al. |
| 2013/0017380 A1 | 1/2013 | Murata et al. |
| 2013/0045375 A1 | 2/2013 | Gross |
| 2013/0050992 A1 | 2/2013 | Schneider et al. |
| 2013/0101798 A1 | 4/2013 | Hashimoto |
| 2013/0122260 A1 | 5/2013 | Liang |
| 2013/0122284 A1 | 5/2013 | Gross |
| 2013/0183512 A1 | 7/2013 | Gy et al. ....................... 428/220 |
| 2013/0186139 A1 | 7/2013 | Tanii |
| 2013/0189486 A1 | 7/2013 | Wang et al. |
| 2013/0202868 A1 | 8/2013 | Barefoot et al. |
| 2013/0203583 A1 | 8/2013 | Zhang et al. |
| 2013/0219966 A1 | 8/2013 | Hasegawa et al. |
| 2013/0224492 A1 | 8/2013 | Bookbinder et al. |
| 2013/0236666 A1 | 9/2013 | Bookbinder et al. |
| 2013/0236699 A1 | 9/2013 | Prest et al. |
| 2013/0240025 A1 | 9/2013 | Bersano et al. |
| 2013/0260154 A1 | 10/2013 | Allan et al. |
| 2013/0274085 A1 | 10/2013 | Beall et al. |
| 2013/0288001 A1 | 10/2013 | Murata et al. |
| 2013/0288010 A1 | 10/2013 | Akarapu et al. |
| 2013/0309613 A1 | 11/2013 | O'Malley et al. |
| 2013/0323444 A1 | 12/2013 | Ehemann et al. |
| 2014/0050911 A1 | 2/2014 | Mauro et al. |
| 2014/0063393 A1 | 3/2014 | Zhong et al. |
| 2014/0087159 A1 | 3/2014 | Cleary et al. |
| 2014/0087193 A1 | 3/2014 | Cites et al. |
| 2014/0087194 A1 | 3/2014 | Dejneka et al. |
| 2014/0090864 A1 | 4/2014 | Paulson |
| 2014/0092377 A1 | 4/2014 | Liu et al. |
| 2014/0093702 A1 | 4/2014 | Kitajima |
| 2014/0106141 A1 | 4/2014 | Bellman et al. |
| 2014/0106172 A1 | 4/2014 | Dejneka et al. |
| 2014/0109616 A1 | 4/2014 | Varshneya |
| 2014/0113141 A1 | 4/2014 | Yamamoto et al. |
| 2014/0134397 A1 | 5/2014 | Amin et al. |
| 2014/0139978 A1 | 5/2014 | Kwong |
| 2014/0141226 A1 | 5/2014 | Bookbinder et al. |
| 2014/0147576 A1 | 5/2014 | Lewis et al. |
| 2014/0150525 A1 | 6/2014 | Okawa et al. |
| 2014/0151370 A1 | 6/2014 | Chang et al. |
| 2014/0154661 A1 | 6/2014 | Bookbinder et al. |
| 2014/0170380 A1 | 6/2014 | Murata et al. |
| 2014/0193606 A1 | 7/2014 | Kwong |
| 2014/0220327 A1 | 8/2014 | Adib et al. |
| 2014/0227523 A1 | 8/2014 | Dejneka et al. |
| 2014/0227524 A1 | 8/2014 | Ellison et al. |
| 2014/0234607 A1 | 8/2014 | Matsuda et al. |
| 2014/0248495 A1 | 9/2014 | Matsuda et al. |
| 2014/0308526 A1 | 10/2014 | Chapman et al. |
| 2014/0321124 A1 | 10/2014 | Schneider et al. |
| 2014/0329660 A1 | 11/2014 | Barefoot et al. |
| 2014/0335330 A1 | 11/2014 | Bellman et al. |
| 2014/0356576 A1 | 12/2014 | Dejneka et al. |
| 2014/0356605 A1 | 12/2014 | Adib et al. |

(56) References Cited

U.S. PATENT DOCUMENTS

| | | |
|---|---|---|
| 2014/0364298 A1 | 12/2014 | Ohara et al. |
| 2014/0370264 A1 | 12/2014 | Ohara et al. |
| 2014/0370302 A1 | 12/2014 | Amin et al. |
| 2015/0004390 A1 | 1/2015 | Kawamoto et al. |
| 2015/0011811 A1 | 1/2015 | Pavone et al. |
| 2015/0027169 A1 | 1/2015 | Fredholm |
| 2015/0030834 A1 | 1/2015 | Morey et al. |
| 2015/0030838 A1 | 1/2015 | Sellier et al. |
| 2015/0037543 A1 | 2/2015 | Keegan et al. |
| 2015/0037586 A1 | 2/2015 | Gross |
| 2015/0044473 A1 | 2/2015 | Murata et al. |
| 2015/0060401 A1 | 3/2015 | Chang et al. |
| 2015/0064472 A1 | 3/2015 | Gross et al. |
| 2015/0064474 A1 | 3/2015 | Dejneka et al. |
| 2015/0079398 A1 | 3/2015 | Amin et al. |
| 2015/0093581 A1 | 4/2015 | Murata et al. |
| 2015/0111030 A1 | 4/2015 | Miyasaka et al. |
| 2015/0132563 A1 | 5/2015 | O'Malley et al. |
| 2015/0140325 A1 | 5/2015 | Gross et al. |
| 2015/0144291 A1 | 5/2015 | Brandt et al. |
| 2015/0147574 A1 | 5/2015 | Allan et al. |
| 2015/0147575 A1 | 5/2015 | Dejneka et al. |
| 2015/0147576 A1 | 5/2015 | Bookbinder et al. |
| 2015/0152003 A1 | 6/2015 | Kawamoto et al. |
| 2015/0157533 A1 | 6/2015 | Demartino et al. |
| 2015/0166401 A1 | 6/2015 | Yamamoto |
| 2015/0166407 A1 | 6/2015 | Varshneya et al. |
| 2015/0175469 A1 | 6/2015 | Tabe |
| 2015/0183680 A1 | 7/2015 | Barefoot et al. |
| 2015/0239775 A1 | 8/2015 | Amin et al. |
| 2015/0239776 A1 | 8/2015 | Amin et al. |
| 2015/0251947 A1 | 9/2015 | Lestrigant et al. |
| 2015/0259244 A1 | 9/2015 | Amin et al. |
| 2015/0261363 A1 | 9/2015 | Shah et al. |
| 2015/0274585 A1 | 9/2015 | Rogers et al. |
| 2015/0329418 A1 | 11/2015 | Murata et al. |
| 2015/0368148 A1 | 12/2015 | Duffy et al. |
| 2015/0368153 A1 | 12/2015 | Pesansky et al. |
| 2016/0102014 A1 | 4/2016 | Hu et al. |
| 2016/0107924 A1 | 4/2016 | Yamamoto et al. |
| 2016/0122239 A1 | 5/2016 | Amin et al. |
| 2016/0122240 A1 | 5/2016 | Oram et al. |
| 2016/0187994 A1 | 6/2016 | La et al. |
| 2016/0265368 A1 | 9/2016 | Bencini et al. |
| 2016/0318796 A1 | 11/2016 | Masuda |
| 2016/0333776 A1 | 11/2016 | Andersson et al. |
| 2017/0158556 A1 | 6/2017 | Dejneka et al. |
| 2017/0197869 A1 | 7/2017 | Beall et al. |
| 2017/0197870 A1 | 7/2017 | Finkeldey et al. |
| 2017/0291849 A1 | 10/2017 | Dejneka et al. |
| 2017/0295657 A1 | 10/2017 | Gross et al. |
| 2017/0305786 A1 | 10/2017 | Roussev et al. |

FOREIGN PATENT DOCUMENTS

| | | |
|---|---|---|
| CN | 1312582 A | 9/2001 |
| CN | 1759074 A | 4/2006 |
| CN | 1886348 A | 12/2006 |
| CN | 101316799 A | 12/2008 |
| CN | 101578240 A | 11/2009 |
| CN | 101583576 A | 11/2009 |
| CN | 102026929 A | 4/2011 |
| CN | 102089252 A | 6/2011 |
| CN | 102363567 A | 2/2012 |
| CN | 102791646 A | 11/2012 |
| CN | 102815860 A | 12/2012 |
| CN | 102898022 A | 1/2013 |
| CN | 102958855 A | 3/2013 |
| CN | 103058506 A | 4/2013 |
| CN | 103058507 A | 4/2013 |
| CN | 103068759 A | 4/2013 |
| CN | 103569015 A | 2/2014 |
| CN | 103946166 A | 7/2014 |
| CN | 104114503 A | 10/2014 |
| EP | 0132751 A1 | 2/1985 |
| EP | 0163873 A1 | 12/1985 |
| EP | 700879 | 3/1996 |
| EP | 0931028 A1 | 7/1999 |
| EP | 1291631 A1 | 3/2003 |
| EP | 1314704 A1 | 5/2003 |
| EP | 2263979 A1 | 12/2010 |
| EP | 2397449 A1 | 12/2011 |
| EP | 2415724 | 2/2012 |
| EP | 2531459 A2 | 12/2012 |
| EP | 2540682 A1 | 1/2013 |
| EP | 2594536 A1 | 5/2013 |
| EP | 2666756 A1 | 11/2013 |
| EP | 2695734 A1 | 2/2014 |
| EP | 2762459 A1 | 8/2014 |
| GB | 1012367 A | 12/1965 |
| GB | 1026770 A | 4/1966 |
| GB | 1089912 A | 11/1967 |
| GB | 1334828 A * | 10/1973 |
| JP | 47-004192 U | 9/1972 |
| JP | 54-083923 A | 7/1979 |
| JP | 07-263318 A | 10/1995 |
| JP | 11-328601 A | 11/1999 |
| JP | 2000-203872 A | 7/2000 |
| JP | 2000-327365 A | 11/2000 |
| JP | 2002-358626 A | 12/2002 |
| JP | 2003-505327 A | 2/2003 |
| JP | 2003-283028 A | 10/2003 |
| JP | 2004-099370 A | 4/2004 |
| JP | 2004-259402 A | 9/2004 |
| JP | 2005-139031 A | 6/2005 |
| JP | 2005-206406 A | 8/2005 |
| JP | 2005-289683 A | 10/2005 |
| JP | 2005-289685 A | 10/2005 |
| JP | 2006-228431 A | 8/2006 |
| JP | 2007-527354 A | 9/2007 |
| JP | 2007-252589 A | 10/2007 |
| JP | 2007-314521 A | 12/2007 |
| JP | 2008-007384 A | 1/2008 |
| JP | 2008-094713 A | 4/2008 |
| JP | 2008-115071 A | 5/2008 |
| JP | 2009-107878 A | 5/2009 |
| JP | 2009099239 | 5/2009 |
| JP | 2009-274902 A | 11/2009 |
| JP | 2010-202514 | 9/2010 |
| JP | 2011-057504 A | 3/2011 |
| JP | 2011213576 A | 10/2011 |
| JP | 2013-028512 A | 2/2013 |
| JP | 2013-529172 A | 7/2013 |
| JP | 2014-501214 A | 1/2014 |
| JP | 2014-073953 A | 4/2014 |
| JP | 2014-136751 A | 7/2014 |
| JP | 2014-141363 A | 8/2014 |
| JP | 2015-511537 A | 4/2015 |
| JP | 2017-502188 A | 1/2017 |
| JP | 2017-502202 A | 1/2017 |
| KR | 10-2012-0128657 A | 11/2012 |
| KR | 10-1302664 B1 | 9/2013 |
| KR | 10-2016-0080048 | 7/2016 |
| RU | 2127711 C1 | 3/1999 |
| SU | 1677028 A1 | 9/1991 |
| TW | 201335092 A | 8/2013 |
| TW | 201341324 A | 10/2013 |
| TW | 201402490 A | 1/2014 |
| TW | 201520178 A | 5/2015 |
| WO | 99/06334 A1 | 2/1999 |
| WO | 2000/047529 A1 | 8/2000 |
| WO | 2005091021 | 9/2005 |
| WO | 2005/093720 A1 | 10/2005 |
| WO | 2010/002477 A1 | 1/2010 |
| WO | 2010/005578 | 1/2010 |
| WO | 2011/041484 A1 | 4/2011 |
| WO | 2011/069338 A1 | 6/2011 |
| WO | 2011077756 | 6/2011 |
| WO | 2011/097314 A2 | 8/2011 |
| WO | 2011/103798 A1 | 8/2011 |
| WO | 2011/103799 A1 | 8/2011 |
| WO | 2011/149812 A1 | 11/2011 |
| WO | 2011149811 A1 | 12/2011 |
| WO | WO 2012/074983 A1 * | 6/2012 |

(56) References Cited

FOREIGN PATENT DOCUMENTS

| WO | 2012126394 | 9/2012 |
|---|---|---|
| WO | 2013/016157 A1 | 1/2013 |
| WO | 2013/028492 A1 | 2/2013 |
| WO | 2013/032890 A1 | 3/2013 |
| WO | 2013/047679 A1 | 4/2013 |
| WO | 2013/082246 A1 | 6/2013 |
| WO | 2013/088856 | 6/2013 |
| WO | 2013/116420 A1 | 8/2013 |
| WO | 2013/130665 A2 | 9/2013 |
| WO | 2013/130721 A1 | 9/2013 |
| WO | 2013/136013 | 9/2013 |
| WO | 2013184205 | 12/2013 |
| WO | 2014/042244 A1 | 3/2014 |
| WO | 2014/052229 A1 | 4/2014 |
| WO | 2014/097623 A1 | 6/2014 |
| WO | 2014/175144 A1 | 10/2014 |
| WO | 2014/180679 A1 | 11/2014 |
| WO | 2015/057552 A2 | 4/2015 |
| WO | 2015/057555 A1 | 4/2015 |
| WO | 2015/077179 A1 | 5/2015 |
| WO | 2015127483 | 8/2015 |
| WO | 2015/175595 A1 | 11/2015 |
| WO | 2016/028554 A1 | 2/2016 |
| WO | 2016/073539 A1 | 5/2016 |
| WO | 2016070048 A1 | 5/2016 |
| WO | 2016/174825 A1 | 11/2016 |
| WO | 2016/185934 A1 | 11/2016 |
| WO | 2016/191676 A1 | 12/2016 |
| WO | 2017/030736 A1 | 2/2017 |
| WO | 2017/100646 A1 | 6/2017 |

OTHER PUBLICATIONS

Amin et al; U.S. Appl. No. 14/926,425, filed Oct. 29, 2015, titled "Strengthened Glass With Ultra-Deep Depth of Compression".
ASTM C1279-13 "Standard Test Method for Non-Destructive Photoelastic Measurement of Edge and Surface Stresses in Annealed, Heat-Strengthened, and Fully Tempered Flat Glass".
ASTM C1422/C1422M-10 "Standard Specification for Chemically Strengthened Flat Glass".
Bahlawane "Novel sol-gel process depositing a-Al2O3 for the improvement of graphite oxidation-resistance"—Thin Solid Films, vol. 396, pp. 126-130, 2001.
Dessler et al; "Differences between films and monoliths of sol-gel derived aluminas", Thin Solid Films, vol. 519, pp. 42-51, 2010.
Fu, et al, "Preparation of alumina films from a new sol-gel route" Thin Solid films 348, pp. 99-102 (1999).
Hauk "Sol-gel preparation of scratch-resistant Al2O3 coatings on float glass", Glass Science and Technology: Glastechnische Berichte, 72(12), pp. 386, 1999.
International Search Report and the Written Opinoin of the International Searching Authority; PCT/SU2015/035448; dated Sep. 18, 2015; 11 Pages.
Oram et al; U.S. Appl. No. 14/932,411, filed Nov. 4, 2015, Titled "Deep Non-Frangible Stress Profiles and Methods of Making".
International Search Report and Written Opinion of the International Searching Authority; PCT/US2015/023507; dated Oct. 19, 2015; 19 Pages.
International Search Report and Written Opinion of the International Searching Authority; PCT/US2015/034996 dated Jan. 4, 2016; 13 Pages.
International Search Report and Written Opinion of the International Searching Authority; PCT/US2015/058322 dated Jan. 8, 2016; 14 Pages.
International Search Report and Written Opinion of the International Searching Authority; PCT/US2015/058919;dated Jan. 11, 2016; 11 Pages.
International Search Report and Written Opinion of the International Searching Authority; PCTUS2015041976; dated Oct. 29, 2015; 11 Pages.

Pflitsch et al; "Sol-gel deposition of chromium doped aluminum oxide films (Ruby) for surface temperature sensor application", Chem. Mater., vol. 20, pp. 2773-2778, 2008.
Stosser et al "Magnetic Resonance investigation of the process of corundum formation starting from sol-gel precursors", J. Am. Ceram. Soc, vol. 88, No. 10, pp. 2913-2922, 2005.
International Search Report and Written Opinion PCT/US2016/034634 dated Nov. 2, 2016.
English Translation of CN2015800558699.9 Office Action Dated Dec. 2, 2020; 17 pages; Chinese Patent Office.
Taiwanese Application No. 104136076; Office Action dated Dec. 22, 2020; 6 pages (English Translation Only) Taiwanese Patent Office.
Barnett Technical Services, "Surface Stress Meters", Available Online at <https://web.archive.org/web/20200925054825/https://barnett-technical.com/luceo/surface-stress/>, Retrieved on Sep. 25, 2020, 4 pages.
Inaba et al., "Non-destructive Stress Measurement in Double Ion-Exchanged Glass Using Optical Guided-Waves and Scattered Light", Journal of the Ceramic Society of Japan 2017, vol. 125, No. 11, pp. 814-820.
Abrams et al; "Fracture behavior of engineered stress profile soda lime silicate glass"; Journal of Non-Crystalline Solids; 321, (2003) 10-19.
Bansal et al; "Chapter 10: Elastic Properties" Handbook of Glass Properties; Elsevier; (1986) pp. 306-336.
Bouyne et al; "Fragmentation of thin chemically tempered glass plates"; Glass Technol., 2002, 43C, 300-2.
Brunkov et al; "Submicron-Resolved Relief Formation in Poled Glasses and Glass-Metal Nanocomposites"; Technical Physics Letters, 2008, vol. 34, No. 12 pp. 1030-1033.
Bubsey, R.T. et al., "Closed-Form Expressions for Crack-Mouth Displacement and Stress Intensity Factors for Chevron-Notched Short Bar and Short Rod Specimens Based on Experimental Compliance Measurements," NASA Technical Memorandum 83796, pp. 1-30 (Oct. 1992).
ChemCor Product Specification.
Corning leads $62M Investment in 'smart' glass maker view, Jun. 19, 2013; http://optics.org/news/4/6/27.
Corning, "Nook—Stress Profile Measurement", Corning Incorporated, 2019, 4 slides.
Corning, "What Makes Chemcor Glass Work?", 1990, 2 pages.
Declaration of Rostislav V. Roussev; 9 Pages; Aug. 11, 2019.
Donald "Review Methods for Improving the Mechanical Properties of Oxide Glasses"; Journal of Materials Science 24 (1989) 4177-4208.
Dusil J. And Stmad Z., "Black colored glass ceramics based on beta-quartz solid solutions," Glass 1977: proceedings of the 11th International Congress on Glass, Prague, Czechoslovakia, Jul. 4-8, 1977, vol. 2, pp. 139-149.
Glover et al., "The Interactive Whiteboard: a Literature Study"; Technology, Pedagogy and Education, vol. 14, 2, 2005, pp. 155-170.
Greaves et al; "Inorganic Glasses, Glass-Forming Liquids and Amorphizing Solids", Advances in Physics; vol. 56, No. 1, Jan.-Feb. 2007, 1166.
Green; "Section 2. Residual stress, brittle fracture and damage; Critical parameters in the processing of engineered stress profile glasses"; Journal of Non-Crystalline Solids, 316 (2003) 35-41.
Gulati, "Frangibility of tempered soda-lime glass sheet" Glass Processing Days, Sep. 13-15, 1997. pp. 72-76.
Guo Xingzhong Yang Hui Cao Ming, Nucleation and crystallization behavior of Li2O-Al2O3-SiO2 system glass-ceramic containing little fluorine and no-fluorine, J.Non-Cryst.Solids, 2005, vol. 351, No. 24-26, p. 2133-2137.
Hampshire; "Section 3. Oxynitride Glasses; Oxynitride Glasses, Their Properties and Crystallisation—A Review", Journal of Non-Crystalline Solids 316 (2003) p. 64-73.
Kitaigorodskii I.I.'Sentyurin G.G.' 'Egorova L.S.', In: Sb.Nauchn. Rabot Belor.Politekhn.Inst.,Khimiya, Tekhnologiya Istoriya Stekla i Keramiki, 1960, No. 86, p. 38. (The Synthesis of Thermo-stable glasses) Abstract Only.
Le Bourhis; "Hardness"; Glass Mechanics and Technology; 2008; pp. 170-174.

(56) References Cited

OTHER PUBLICATIONS

Peitl et al; "Thermal Shock Properties of Chemically Toughened Borosilicate Glass"; Journal of Non-Crystallin Solids, 247, (1999) pp. 39-49.

Poumellec et al; "Surface topography change induced by poling in Ge doped silica glass films"; 2003 OSA/BGPP 2003 MD 38.

Reddy, K.P.R. et al, "Fracture Toughness Measurement of Glass and Ceramic Materials Using Chevron-Notched Specimens," J. Am. Ceram. Soc., 71 [6], C-310-C-313 (1988).

Rusan et al; "A New Method for Recording Phase Optical Structures in Glasses"; Glass Physics and Chemistry, 2010, vol. 36, No. 4, pp. 513-516.

Sglavo & Green, "Flaw-insensitive ion-exchanged glass: 11, Production and mechanical performance" J. Am. Ceram. Soc. 84(8) pp. 1832-1838 (2001).

Sglavo et al. "procedure for residual stress profile determination by vurbature measurements" Mechanics of Materias, 2005, 37(8) pp. 887-898.

Shen et al; "Control of concentration profiles in two step ion exchanged glasses"; Phys. Chem. Glasses, 2003 44 (4), 284-92.

Shen et al; "Variable-temperature ion-exchanged engineered stress profile (ESP) glasses"; J. Am. Ceram. Soc., 86 [11] 1979-81 (2003).

Smedskjaer "Effect of thermal history and chemical composition on hardness of silicate glasses"; Journal of Non-Crystalline Solids 356 (2010); pp. 893-897.

Takagi et al; "Electrostatic Imprint Process for Glass"; Applied Physics Express 1 (20008) 024003.

Tang et al. "Methods for measurement and statistical analysis of the frangibility of strengthened glass" Frontiers in Materials, 2015 vol. 2, article 50. 8 pgs.

Tang, et al., "Automated Apparatus for Measuring the Frangibility and Fragmentation of Strengthened Glass", Experimental Mechanics (Jun. 2014) vol. 54 pp. 903-912.

Varshneya; "Fundamentals of Inorganic Glasses"; 2nd edition, Society of Glass Technology, 2006, pp. 513-521, XP002563094.

Zheng et al., "Structure and Properties of the Lithium Aluminosilicate Glasses with Yttria Addition", Wuhan University of Technology, vol. 22, No. 2, 2007, pp. 362-366.

Zheng et al; "Effect of Y2O3 addition on viscosity and crystallizationof the lithium aluminosilicate glasses"; Thermochimica Acta 456 (2007) 69-74.

Zimmer, "Thin Glasses for Touch Display Technologies" Schott: glass made of ideas. Emerging Display Technologies Conference, Aug. 16-17, 2011. 17 slides.

\* cited by examiner

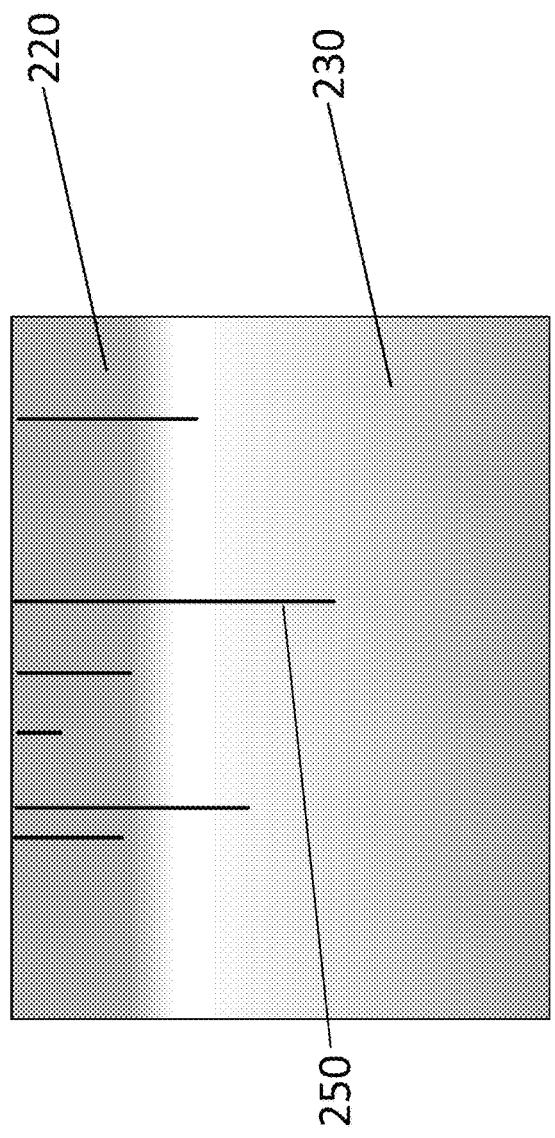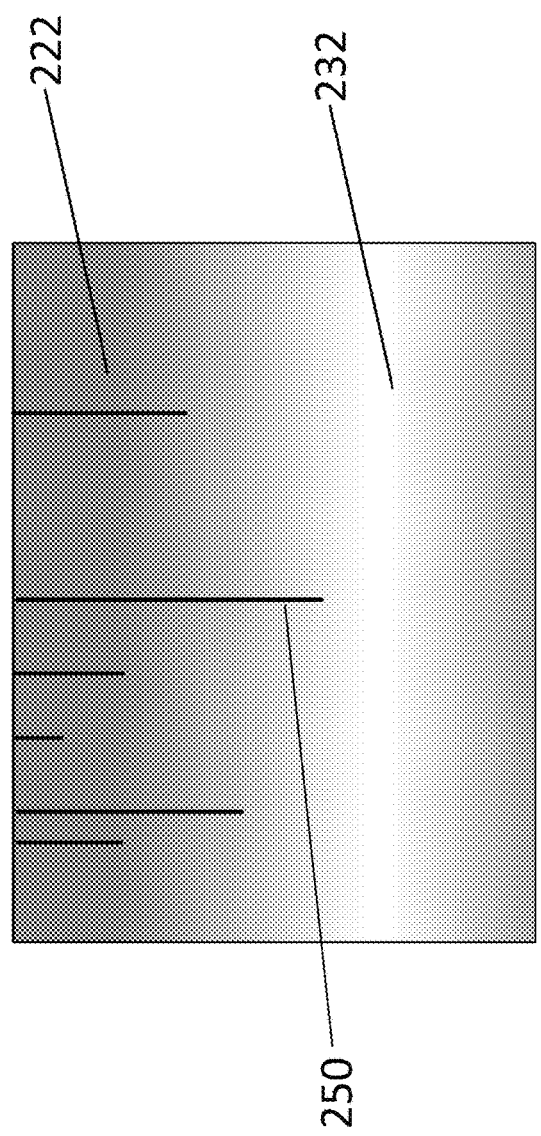

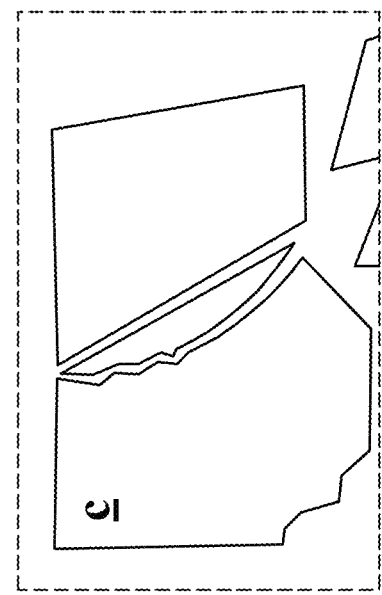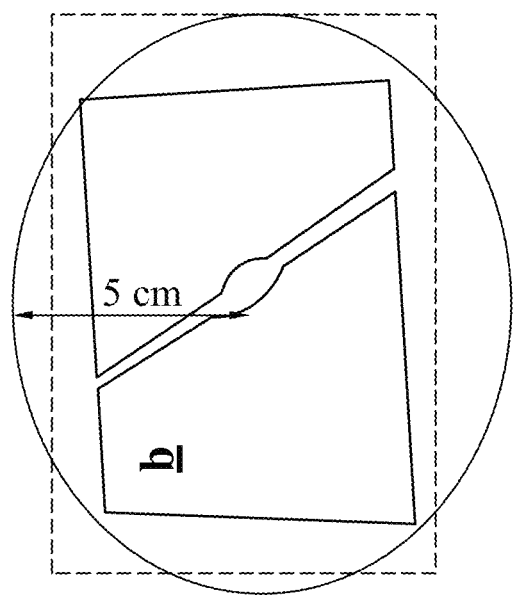
FIG. 10b

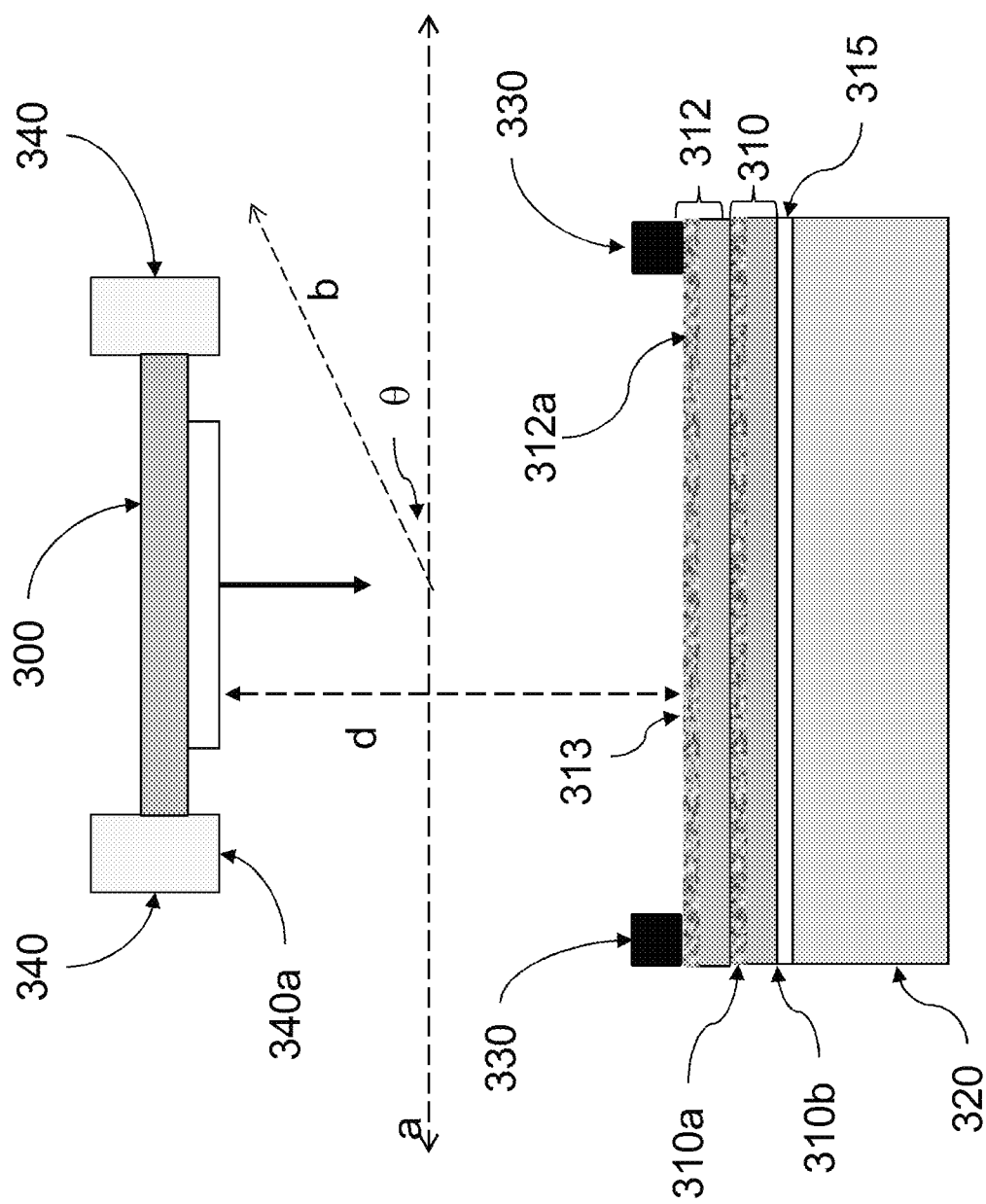

STRENGTHENED GLASS ARTICLES HAVING IMPROVED SURVIVABILITY

This application claims the benefit of priority under 35 U.S.C. § 119 of U.S. Provisional Application Ser. No. 61/943,758, filed on Feb. 24, 2014 and also claims priority to U.S. Provisional Application Ser. No. 61/858,882, filed on Jul. 26, 2013, the contents of which are relied upon and incorporated herein by reference in its entirety.

BACKGROUND

Embodiments of the present disclosure are generally directed to strengthened glass having improved fracture resistance, and are specifically directed to fracture resistance strengthened glasses having a compression layer with a depth (DOL) of at least about 70 μm.

Strengthened glasses have been identified for use in electronic devices as well as in other applications. As strengthened glasses are increasingly being utilized, it has become more important to develop strengthened glass materials having improved survivability, especially when subjected to tensile stresses caused by contact with hard/sharp surfaces, such as asphalt or concrete, experienced in "real world" use and applications.

SUMMARY

Strengthened glasses may be used as cover plates or windows for portable or mobile electronic communication and entertainment devices, such as cellular phones, smart phones, tablets, video players, information terminal (IT) devices, laptop computers and the like. As used herein, the term "cover plate" or "cover glass" includes windows or the like for display and touch screen applications, as well as in other applications requiring transparency, high strength and abrasion resistance. Additionally, the cover glass may be used as used as decorative pieces such as the back and side surfaces of electronic devices.

To evaluate the strength and abrasion resistance for electronic device cover glass performance, diverse drop test methodologies are used by manufacturers, customers and other market entities. Concrete and asphalt are two typical drop surfaces used when investigating failure probability as a result of sharp contact damage. In such failures, a glass panel including the cover glass may fracture due the glass contacting sharp or hard drop surfaces.

Embodiments of the disclosure are directed to strengthened glass articles which do not fracture when contacting sharp or hard drop surfaces. Further embodiments of the present disclosure are directed to test methods developed to consistently simulate conditions (e.g., a device dropping on asphalt or concrete) that generate field failures in mobile electronic devices. In specific embodiments of the present disclosure, the test methods use abrasive media of controlled size and chemistry bonded to a surface (e.g. sandpaper) to simulate hard/sharp surface contact, while incrementally increasing the drop height for successive drop tests.

According to one aspect of the disclosure, a strengthened glass article is provided. The strengthened glass article comprises a thickness t≤1 mm (1000 μm), an inner region under a central tension CT (in MPa), and at least one compressive stress layer adjacent the inner region and extending within the strengthened glass article from a surface of the strengthened glass article to a depth of layer DOL (in μm), wherein the strengthened glass article is under a compressive stress at the surface $CS_s$ (in MPa). The strengthened glass article is an alkali aluminosilicate glass article comprising 0-5 mol % $Li_2O$, and at least 3 mol % $Al_2O_3$. Further, the strengthened glass article has a DOL≥70 μm, and a $CS_s$/DOL ratio≥2.5 MPa/μm. These $CS_s$ and DOL values were computed using the FSM technique as described below.

In a further aspect, the strengthened glass article comprises at least 5 mol % $Na_2O$, and when subjected to a point impact sufficient to break the strengthened glass article, has a frangibility index of less than 3.

According to yet another aspect, the strengthened glass article comprises a $CS_s$/DOL ratio≥3.0 MPa/μm, and a CT≤150 MPa.

These and other aspects, advantages, and salient features will become apparent from the following detailed description, the drawings, and the appended claims.

BRIEF DESCRIPTION OF THE DRAWINGS

FIG. 3A is a schematic illustration depicting the impact of flaws for strengthened glass articles with lower DOL compressive layers.

FIG. 3B is a schematic illustration depicting the impact of flaws for strengthened glass articles with deeper DOL compressive layers.

FIG. 10b is a photograph showing strengthened glass sheets that exhibit non-frangible behavior upon fragmentation;

FIG. 12 is a schematic view of drop test equipment described herein.

DETAILED DESCRIPTION

Embodiments of strengthened glass articles with improved survivability are provided below. The strengthened glass article of the present disclosure, which is typically chemically strengthened via ion exchange but also may be strengthened via lamination or thermal tempering, encompasses various glass types, e.g., aluminosilicate glass (e.g., alkali aluminosilicate glass), soda-lime glass, borosilicate glasses, etc. For example, and not by way of limitation, the glass article is comprised of an alkali aluminosilicate glass.

As described herein, compressive stress (CS) and central tension (CT) are expressed herein in terms of megaPascals (MPa), depth of layer (DOL) is expressed herein in terms of microns (μm), where 1 μm=0.001 mm, and thickness t is expressed herein in terms of millimeters, where 1 mm=1000 μm, unless otherwise specified. Concentrations and compositions described herein are expressed in mole percent (mol %), unless otherwise specified.

Figure 1:
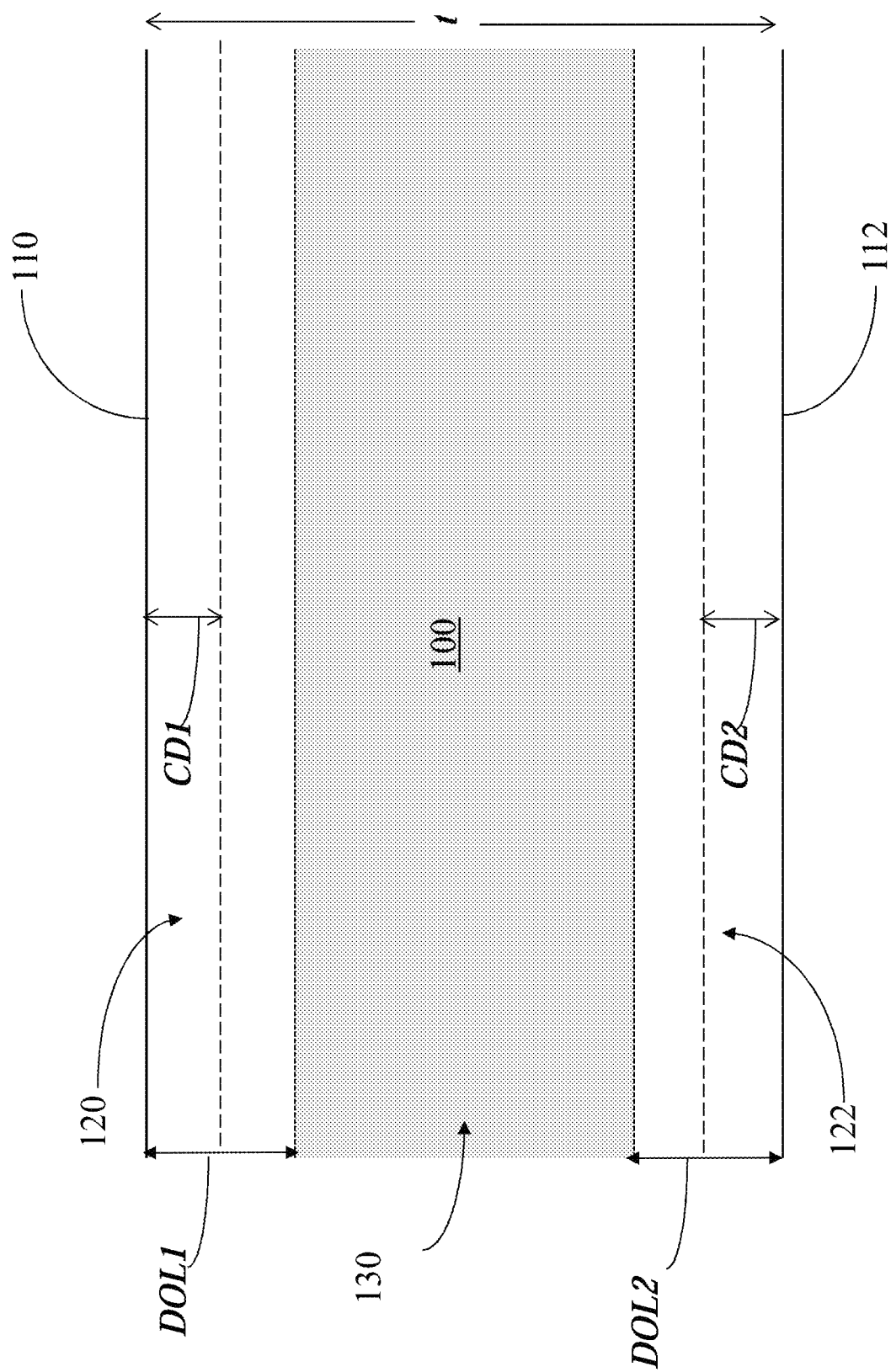
FIG. 1 is a schematic illustration of a strengthened glass article according to one or more embodiments of the present disclosure.
Figure 2:
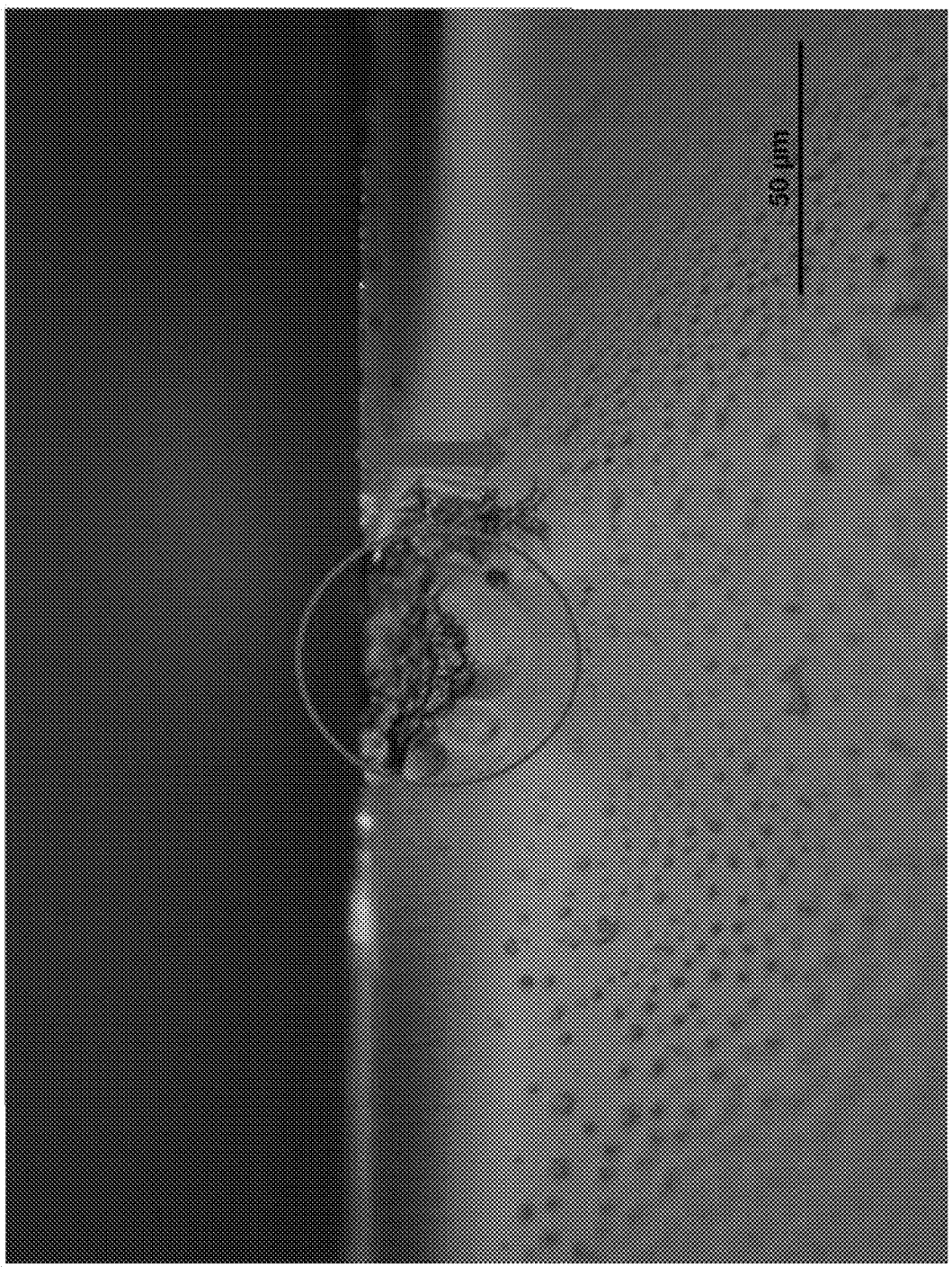
FIG. 2 is a micrograph showing a flaw on a surface of a strengthened glass article.

A cross-sectional schematic view of a chemically strengthened glass article embodiment is shown in FIG. 1. Glass article 100 has a thickness t, first surface 110, and second surface 112. While the embodiment shown in FIG. 1 depicts a glass article 100 as a flat planar sheet or plate, glass article may have other configurations, such as three dimensional shapes or non-planar configurations. Glass article 100 has a first compressive layer 120 extending from first surface 110 to a depth of layer $DOL_1$ into the bulk of the glass article 100. In the embodiment shown in FIG. 1, glass article 100 also has a second compressive layer 122 extending from second surface 112 to a second depth of layer $DOL_2$. Glass article 100 also has a central region 130 between compressive layers 120 and 122. Central region 130 is under a tensile stress or central tension (CT), which balances or counteracts the compressive stresses of layers 120 and 122, respectively. As will be explained below, the glass article 100 includes intermediate critical depths $CD_1$ and $CD_2$ within compressive stress layers 120 and 122. Without being bound by theory, these intermediate critical depths $CD_1$ and $CD_2$ and the compressive stresses at these critical depths are sufficient to increase survivability of the glass article 100 by enveloping or encasing a flaw introduced by sharp impact to first and second surfaces 110, 112 of the glass article 100. For reference, a depiction of a flaw contacting a glass surface is shown in the micrograph of FIG. 2.

Conventional strengthened glass used for cover applications has depth of layer (DOL)<50 μm, which is often limited by the capability of the glass to achieve high DOL in a practical ion-exchange time. Without being bound by theory, strengthened glass is strong in compression, and weak in tension. Referring to FIG. 3B, if a flaw 250 is present on the glass surface, provided the flaw 250 is within the compression layer 220 defined by a depth of layer DOL and does not penetrate into the central region 230, the glass will likely not fail. However, referring to FIG. 3A, if the flaw 250 penetrates the compression layer 222 into the central region 232, then the glass can fail. As the DOL of the compression layer 222 is increased in the glass, the glass is able to contain or envelop deeper flaws within the compression layer 222, as illustrated in FIG. 3B.

Figure 4:
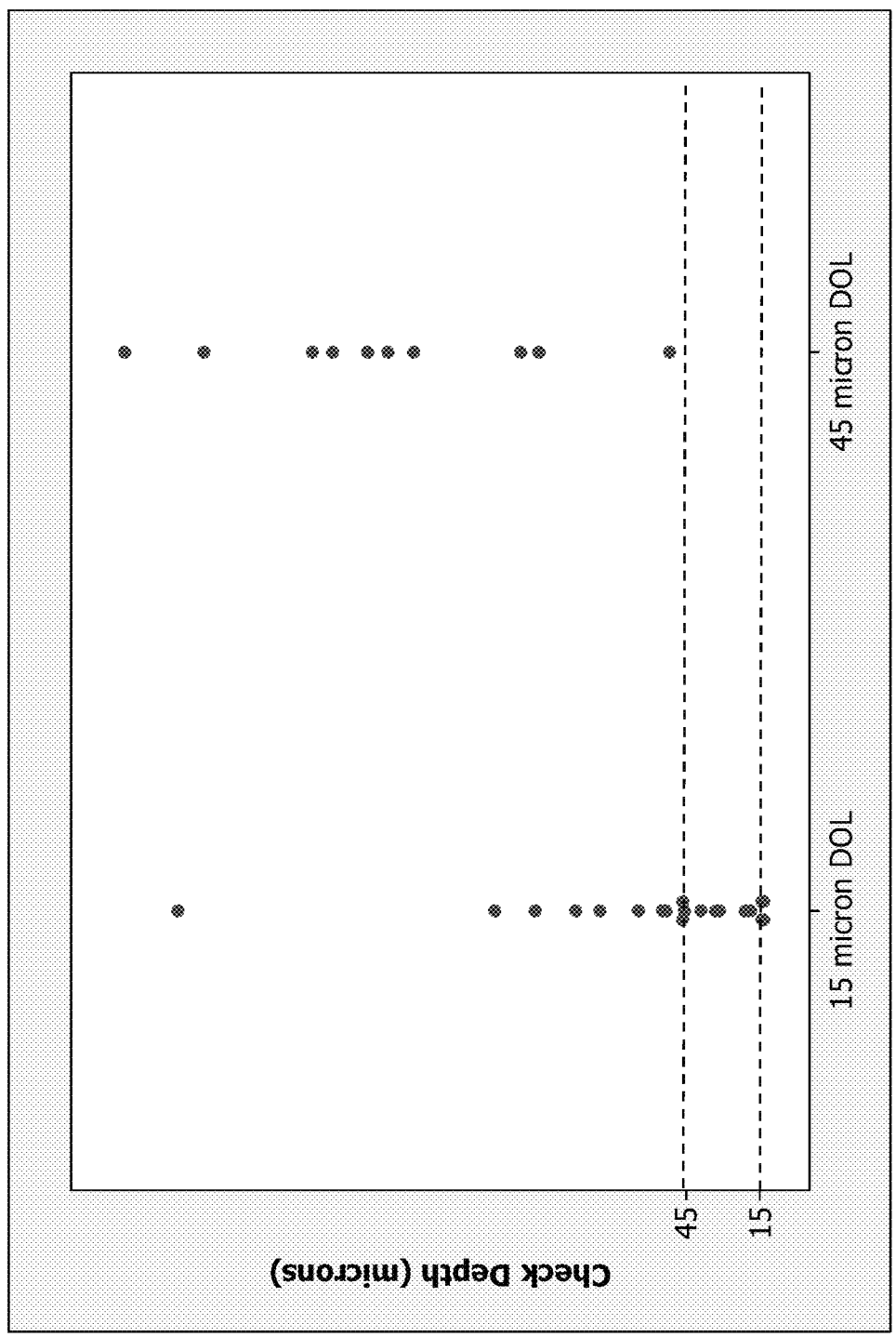
FIG. 4 is a graphical illustration ("check depth plot") depicting the comparative effect of flaws for strengthened glass articles with DOL values of 15 μm and 45 μm, respectively.

For example, FIG. 4 shows the depths of typical flaws in strengthened glass that have failed in the field. As used herein, "failed in the field" means cover glass failures resulting from real world users dropping their commercial smartphone or electronic devices. The data shows that for glass where the DOL is about 15 μm, the typical flaws, which have caused failures, are greater than 15 μm. Likewise, for glass with a depth of layer of 45 μm, typical failure-causing flaws are greater than 45 μm. When viewing the field data of FIG. 4, it is clear that a strengthened glass article with a depth of layer of 15 μm has significantly more failures than a strengthened glass article with a depth of layer of 45 μm, because the deeper DOL is superior at enveloping flaws. Thus, without being bound theory, strengthened glass articles with a deeper DOL compressive layer improve device survivability in the field due to the ability of the glass to envelop or encase deeper flaws within the compression layer.

The degree of chemical strengthening achieved by ion exchange may be quantified based on the parameters of central tension (CT), compressive stress (CS), and depth of layer (DOL). Compressive stress CS may be measured near the surface or within the strengthened glass at various depths. The maximum compressive stress value is the measured compressive stress at the surface ($CS_s$) of the strengthened glass. The ion exchange process yields a compressive stress layer having a thickness defined as a depth of layer (DOL). The central tension CT, which is computed for the inner region adjacent the compressive stress layer within a glass article, can be calculated from the compressive stress CS, the thickness t, and the DOL.

Compressive stress and depth of layer are measured using those means known in the art. Such means include, but are not limited to, measurement of surface stress (FSM) using commercially available instruments such as the FSM-6000, manufactured by Luceo Co., Ltd. (Tokyo, Japan), or the like, and methods of measuring compressive stress and depth of layer are described in ASTM 1422C-99, entitled "Standard Specification for Chemically Strengthened Flat Glass," and ASTM 1279.19779 "Standard Test Method for Non-Destructive Photoelastic Measurement of Edge and Surface Stresses in Annealed, Heat-Strengthened, and Fully-Tempered Flat Glass," the contents of which are incorporated herein by reference in their entirety. Surface stress measurements rely upon the accurate measurement of the stress optical coefficient (SOC), which is related to the birefringence of the glass. SOC in turn is measured by those methods that are known in the art, such as fiber and four point bend methods, both of which are described in ASTM standard C770-98 (2008), entitled "Standard Test Method for Measurement of Glass Stress-Optical Coefficient," the contents of which are incorporated herein by reference in their entirety, and a bulk cylinder method. In various sections of the disclosure, central tension CT and compressive stress CS are expressed herein in megaPascals (MPa), thickness t is expressed in either microns (μm) or millimeters (mm), and depth of layer DOL is expressed in microns (μm).

The DOL values disclosed herein, specifically the DOL values of at least 70 μm, reflect DOL values computed using the FSM technique. For clarity, the DOL value represents the thickness of at least one compression stress layer, which means that the strengthened glass article may have one compression layer with a DOL of at least 70 μm or two compression layers with each having a DOL of at least 70 μm. The disclosed DOL values are not a combination, for example, a sum or average, of the two compressive stress layers.

While the DOL values disclosed and claimed herein were obtained using the FSM technique; however, for illustration purposes only, the stress profiles of FIGS. 5-8 were plotted using the Roussev technique. The Roussev technique is described in the Roussev et al U.S. application Ser. No. 13/463,322 entitled Systems And Methods for Measuring the Stress Profile of Ion-Exchanged Glass, which is incorporated by reference herein in its entirety, discloses two methods for extracting detailed and precise stress profiles (stress as a function of depth) of tempered or chemically strengthened glass.

In accordance with one embodiment of the present disclosure, the strengthened glass article is an alkali aluminosilicate glass article comprising a thickness t≤1 mm (1000 μm), a DOL≥70 μm, and a $CS_s$/DOL ratio≥2.5 MPa/μm.

The numerous exemplary glass compositions provided below demonstrate that various glass compositions are suitable; however, in specific embodiments, the alkali aluminosilicate glass may comprise 0-5 mol % $Li_2O$, or 0-3 mol % $Li_2O$. Alternatively, the strengthened glass article may comprise at least 3 mol % $Al_2O_3$, or about 3-17 mol % $Al_2O_3$. In further exemplary embodiments, the alkali aluminosilicate glass may comprise 0-5 mol % $K_2O$, and/or 0-10 mol % MgO. Moreover, the alkali aluminosilicate may also comprise at least 5 mol % $Na_2O$, or at least 8 mol % $Na_2O$, or at least 12 mol % $Na_2O$. Alternative glass embodiments may include a range of 5-20 mol % $Na_2O$ Moreover, various DOL values are contemplated for the deep DOL glass articles of the present disclosure, for example, DOL values of at least 70 μm as stated above, or at least 90 μm, or at least 100 μm, or at least 110 μm. In further embodiments, the DOL may be in a range from 70 to 150 μm, or from 90 to 120 μm. Without being limited by theory, strengthened glass articles having this deeper DOL exhibit fracture resistance even when formed into 3D shapes.

For strengthened glasses with these deeper DOL values (i.e., ≥70 μm), various compressive stress values at the surface, $CS_s$, are contemplated. For example and not by way of limitation, the strengthened glass may include a $CS_s$ of at least 250 MPa, or at least 300 MPa, or at least 350 MPa. In further embodiments, the strengthened glasses may have a $CS_s$ in a range from 350 to 500 MPa, or at least 500 MPa. Moreover, the strengthened glass article may also exhibit higher compressive stress values, for example, in a range from 700 to 1200 MPa, or from 800 to 1000 MPa.

As stated above, the strengthened glass articles may exhibit a $CS_s$/DOL ratio≥2.5 MPa; however, various ratios may also be exhibited by such glass articles. For example, the strengthened glass articles may include a $CS_s$/DOL ratio≥3.0 MPa. Moreover, the $CS_s$/DOL ratio may be defined by a range of 2.5 MPa/μm≤$CS_s$/DOL≤15 MPa/μm, or 3 MPa/μm≤$CS_s$/DOL≤12 MPa/μm. For a lower $CS_s$ glass, the CS/DOL ratio may be in a range of 3 MPa/μm≤CS/DOL≤5 MPa/μm. Alternatively, for a higher $CS_s$ glass, the CS/DOL ratio may be in a range of 8 MPa/μm/≤CS/DOL≤10 MPa/μm.

As the strengthened glasses of the present disclosure are considered suitable for various shapes (e.g., 2D and 3D shapes) and may be utilized in various applications, various thicknesses are contemplated herein. In cover glass applications, the strengthened glass articles may comprise a thickness t≤1.0 mm. In another embodiment, the strengthened glass article may have a thickness t≤0.9 mm. In further embodiments, the thickness of the glass article is in a range from about 0.1 mm up to about 1.0 mm, or from about 0.2 mm to about 0.9 mm, or from about 0.5 to about 0.8 mm. In yet another embodiment, the glass may comprise a thickness in a range from about 0.3 mm to about 0.5 mm.

Furthermore, the deep DOL strengthened glass articles may be defined by a ratio of the DOL to the thickness of the glass. For example, the relationship of DOL to the thickness t may be defined by the following equation: 0.2t≥DOL≥0.1t. In a specific embodiment, the strengthened glass article may be defined by the following equation 0.12t≥DOL≥0.1t.

As stated above, strengthened glass articles also may be defined by its central tension. In one or more embodiments of the present disclosure, the strengthened glass article has a CT≤150 MPa, or a CT≤125 MPa, or CT≤100 MPa. The central tension of the strengthened glass correlates to the frangible behavior of the strengthened glass article.

Frangible behavior is characterized by at least one of: breaking of the strengthened glass article (e.g., a plate or sheet) into multiple small pieces (e.g., ≤1 mm); the number of fragments formed per unit area of the glass article; multiple crack branching from an initial crack in the glass article; violent ejection of at least one fragment a specified distance (e.g., about 5 cm, or about 2 inches) from its original location; and combinations of any of the foregoing breaking (size and density), cracking, and ejecting behaviors. As used herein, the terms "frangible behavior" and "frangibility" refer to those modes of violent or energetic fragmentation of a strengthened glass article absent any external restraints, such as coatings, adhesive layers, or the like. While coatings, adhesive layers, and the like may be used in conjunction with the strengthened glass articles described herein, such external restraints are not used in determining the frangibility or frangible behavior of the glass articles.

Figure 10A:
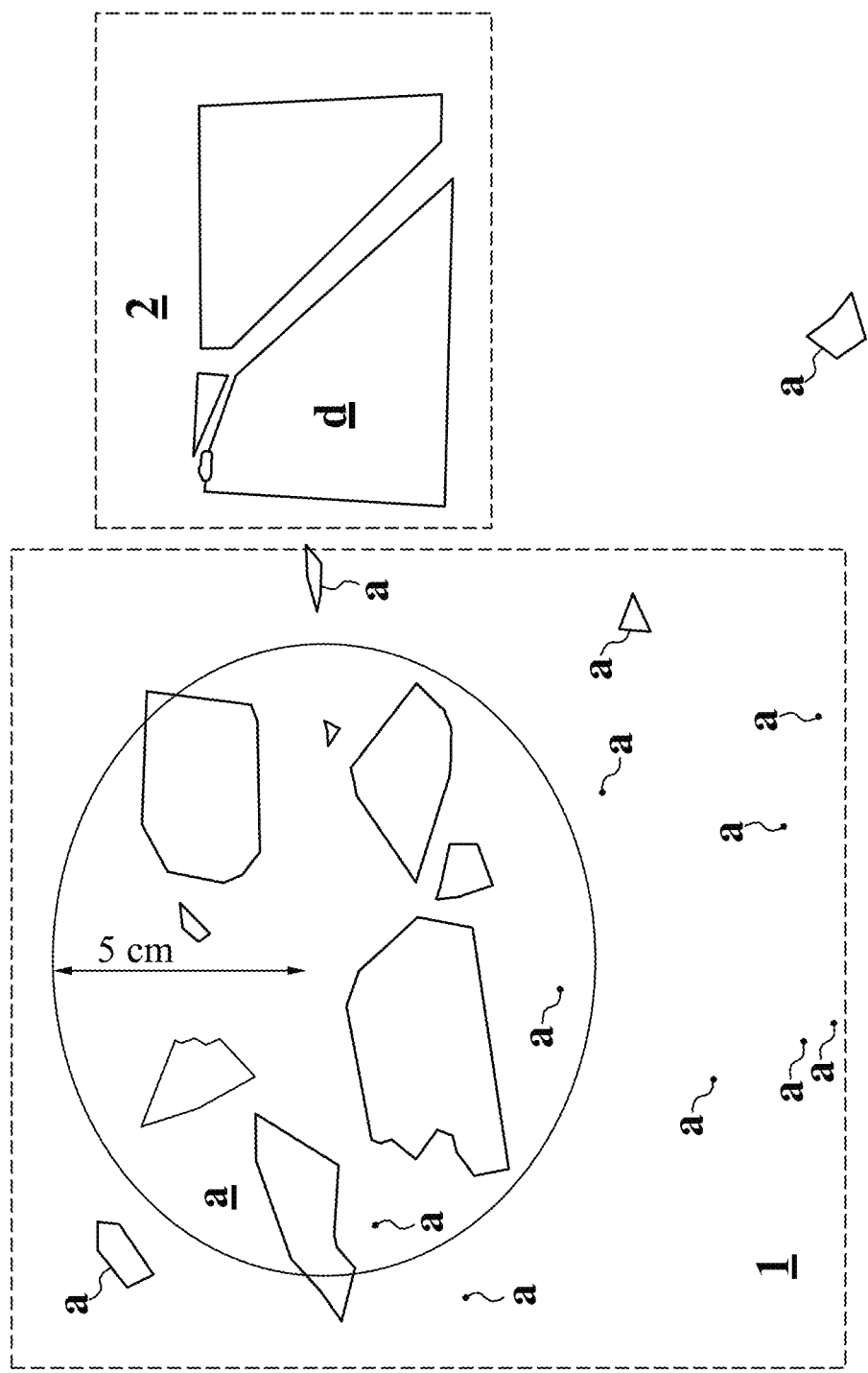
FIG. 10a is a photograph showing strengthened glass articles 1) exhibiting frangible behavior upon fragmentation; and 2) exhibiting non-frangible behavior upon fragmentation.

FIGS. 10a and 10b illustrate examples of frangible behavior and non-frangible behavior of strengthened glass articles upon point impact with a scribe having a sharp tungsten carbide (WC) tip. The point impact test that is used to determine frangible behavior includes an apparatus that is delivered to the surface of the glass article with a force that is just sufficient to release the internally stored energy present within the strengthened glass article. That is, the point impact force is sufficient to create at least one new crack at the surface of the strengthened glass sheet and extend the crack through the compressive stress CS region (i.e., depth of layer) into the region that is under central tension CT. The impact energy needed to create or activate the crack in a strengthened glass sheet depends upon the compressive stress CS and depth of layer DOL of the article, and thus upon the conditions under which the sheet was strengthened (i.e., the conditions used to strengthen a glass by ion exchange). Otherwise, each ion exchanged glass plate shown in FIGS. 10a and 10b was subjected to a sharp dart indenter contact sufficient to propagate a crack into the inner region of the plate, the inner region being under tensile stress. The force applied to the glass plate was just sufficient to reach the beginning of the inner region, thus allowing the energy that drives the crack to come from the tensile stresses in the inner region rather than from the force of the dart impact on the outer surface.

Referring to FIG. 10a, glass plate a can be classified as being frangible. In particular, glass plates a fragmented into multiple small pieces that were ejected, and exhibited a large degree of crack branching from the initial crack to produce the small pieces. Approximately 50% of the fragments are less than 1 mm in size, and it is estimated that about 8 to 10 cracks branched from the initial crack. Glass pieces were also ejected about 5 cm from original glass plate a, as seen in FIG. 10a. A glass article that exhibits any of the three criteria (i.e., multiple crack branching, ejection, and extreme fragmentation) described hereinabove is classified as being frangible. For example, if a glass exhibits excessive branching alone but does not exhibit ejection or extreme fragmentation as described above, the glass is still characterized as frangible.

Glass plates b, c, (FIG. 10b) and d (FIG. 10a) are classified as not frangible. In each of these samples, the glass sheet has broken into a small number of large pieces. Glass plate b (FIG. 10b), for example, has broken into two large pieces with no crack branching; glass plate c (FIG. 10b) has broken into four pieces with two cracks branching from the initial crack; and glass plate d (FIG. 10a) has broken into four pieces with two cracks branching from the initial crack. Based on the absence of ejected fragments (i.e., no glass pieces forcefully ejected more than 2 inches from their original location), no visible fragments ≤1 mm in size, and the minimal amount of observed crack branching, samples b, c, and d are classified as non-frangible or substantially non-frangible.

Based on the foregoing, a frangibility index (Table 1) can be constructed to quantify the degree of frangible or non-frangible behavior of a glass, glass ceramic, and/or a ceramic article upon impact with another object. Index numbers, ranging from 1 for non-frangible behavior to 5 for highly frangible behavior, have been assigned to describe different levels of frangibility or non-frangibility. Using the index, frangibility can be characterized in terms of numerous parameters: 1) the percentage of the population of fragments having a diameter (i.e., maximum dimension) of less than 1 mm ("Fragment size" in Table 1); 2) the number of fragments formed per unit area (in this instance, cm$^2$) of the sample ("Fragment density" in Table 1); 3) the number of cracks branching from the initial crack formed upon impact ("Crack branching" in Table 1); and 4) the percentage of the population of fragments that is ejected upon impact more than about 5 cm (or about 2 inches) from their original position ("Ejection" in Table 1).

TABLE 1

Criteria for determining the degree of frangibility and frangibility index.

| Degree of frangibility | Frangibility index | Fragment size (% ≤ 1 mm) | Fragment density (fragments/cm$^2$) | Crack branching | Ejection (% ≥ 5 cm) |
|---|---|---|---|---|---|
| High | 5 | >20 | >7 | >9 | >6 |
| Medium | 4 | 10 < n ≤ 20 | 5 < n ≤ 7 | 7 < n ≤ 9 | 4 < n ≤ 6 |
| Low | 3 | 5 < n ≤ 10 | 3 < n ≤ 5 | 5 < n ≤ 7 | 2 < n ≤ 4 |
| None | 2 | 0 < n ≤ 5 | 1 < n ≤ 3 | 2 < n ≤ 5 | 0 < n ≤ 2 |
| | 1 | 0 | n ≤ 1 | n ≤ 2 | 0 |

A frangibility index is assigned to a glass article if the article meets at least one of the criteria associated with a particular index value. Alternatively, if a glass article meets criteria between two particular levels of frangibility, the article may be assigned a frangibility index range (e.g., a frangibility index of 2-3). The glass article may be assigned the highest value of frangibility index, as determined from the individual criteria listed in Table 1. In many instances, it is not possible to ascertain the values of each of the criteria, such as the fragmentation density or percentage of fragments ejected more than 5 cm from their original position, listed in Table 1. The different criteria are thus considered individual, alternative measures of frangible behavior and the frangibility index such that a glass article falling within one criteria level will be assigned the corresponding degree of frangibility and frangibility index. If the frangibility index based on any of the four criteria listed in Table 1 is 3 or greater, the glass article is classified as frangible.

Applying the foregoing frangibility index to the samples shown in FIGS. 10a and 10b, glass plate a fragmented into multiple ejected small pieces and exhibited a large degree of crack branching from the initial crack to produce the small pieces. Approximately 50% of the fragments are less than 1 mm in size and it is estimated that about 8 to 10 cracks branched from the initial crack. Based upon the criteria listed in Table 1, glass plate a has a frangibility index of between about 4-5, and is classified as having a medium-high degree of frangibility.

A glass article having a frangibility index of less than 3 (low frangibility) may be considered to be non-frangible or substantially non-frangible. Glass plates b, c, and d each lack fragments having a diameter of less than 1 mm, multiple branching from the initial crack formed upon impact and fragments ejected more than 5 cm from their original position. Glass plate's b, c, and d are non-frangible and thus have a frangibility index of 1 (not frangible).

As previously discussed, the observed differences in behavior between glass plate a, which exhibited frangible behavior, and glass plates b, c, and d, which exhibited non-frangible behavior, in FIGS. 10a and 10b can be attributed to differences in central tension CT among the samples tested. The possibility of such frangible behavior is one consideration in designing various glass products, such as cover plates or windows for portable or mobile electronic devices such as cellular phones, entertainment devices, and the like, as well as for displays for information terminal (IT) devices, such as laptop computers. Moreover, the depth of the compression layer DOL and the maximum value of compressive stress $CS_s$ that can be designed into or provided to a glass article are limited by such frangible behavior.

Accordingly, in further embodiments of the present disclosure, the strengthened glass article, when subjected to a point impact sufficient to break the strengthened glass article, has a frangibility index of less than 3. Further embodiments of non-frangible strengthened glass articles may achieve a frangibility index less than 2 or less than 1.

Further elaborating on the discussion of intermediate critical depths above, the strengthened glass articles of the present disclosure may have a stress profile such that the compressive stress $CS_D$ at an intermediate critical depth of 50 μm below the surface of the strengthened glass article is at least 50 MPa. Additionally, other intermediate critical depths (CD, in μm) below the surface of the glass are also suitable if they have a compressive stress sufficient to envelop or encompass a flaw, thereby preventing fracture or failure of the glass. For example and not by way of limitation, the CD may be in a range from 40 to 60 μm, or about 50 μm. In exemplary embodiments, the compressive stress ($CS_D$) at the CD exhibits a $CS_D$/CD value≥0.5, or in a range from 1 to 5, or from 1 to 3. In further embodiments, at a CD value of 50 μm, the $CS_D$ is at least 50 MPa, or at least 70 MPa, or in a range from 70 to 200 MPa. Alternatively, it is contemplated that the $CS_D$ at the CD may also be less than 50 MPa, for example, in a range from 5 to 50 MPa. Additionally, the stress profile of the strengthened glass may be defined by a $CS_D$ at a depth of 50 μm of least 10% of $CS_s$, or at least 25% of $CS_s$, or in a range from 25 to 75% of $CS_s$.

Without being bound by theory, the strengthened glass articles of the present disclosure demonstrate improved fracture resistance when subjected to repeated drop tests. As used herein, "fracture" means that a crack propagates across the entire thickness and/or entire surface of a substrate when that substrate is dropped. While the person of ordinary skill in the art may contemplate various experimental parameters for the drop test, the strengthened glass articles of the present disclosure have a 60% survival rate (i.e., no fracture is observed) when dropped in a drop test from a height of at least 100 cm onto a drop surface, or from a height of at least 150 cm, or from a height of at least 200 cm, or from a height of 220 cm. For example, a strengthened glass article is described as having a 60% survival rate when dropped from a given height when three of five identical samples survive the drop test without fracture. In some embodiments, the strengthened glass articles of the present disclosure have a 60% survival rate when dropped in a drop test from a height of at least 100 cm, in some embodiments, a 80% survival rate when dropped from 100 cm, and in still other embodiments, a 90% survival rate when dropped from 100 cm.

Further demonstrating the improved survivability of the strengthened glass, the strengthened glass has a 60% survival rate, or 80% survival rate in some embodiments, or 90% survival rate in other embodiments, to withstand fracture when the strengthened glass contacts the drop surface at a flat angle, at a non-flat angle, or both. As used herein, "flat angle" means 180° relative to the drop surface. Various angles relative to the drop surface are contemplated for the "non-flat angle." In the examples below, the non-flat angle is 30° relative to the drop surface.

In some embodiments, the strengthened glass sample to be evaluated is affixed to a rigid (i.e, stiff, inflexible, not easily deformed) chassis or "puck" to simulate a smart phone. The glass may be affixed to the chassis by those means known in the art, such as adhesive tape, epoxy, or the like. In some embodiments, a commercially used smart phone may serve as a chassis. The strengthened glass sample may be retrofitted to the chassis or smart phone so that the sample sits "proud" (i.e., above the bezel and not recessed in the frame of the phone) such that the glass is equidistant from the bezel along the full perimeter of the chassis or smart phone. Due to the combination of the stiff chassis and the glass sitting proud of the bezel, the performance of the sample and chassis is directly related to the properties of the glass, not the chassis. Drop tests using as-manufactured phones produced results comparable to those of the retrofitted glass samples, and thus confirmed that the drop tests described above were truly representative of damage incurred in normal use.

In accordance with the present disclosure, the drop surface is an abrasive surface configured to simulate damage that may result when an electronic device is dropped on "real world" surfaces, such as asphalt. Surviving repeated drops onto the abrasive surface is an indication of better performance on asphalt, as well as other surfaces, e.g., concrete or granite. Various materials are contemplated for the abrasive surface. In some embodiments, the abrasive surface is sandpaper, such as alumina or SiC sandpaper, engineered sandpaper, or any abrasive material having comparable hardness and/or sharpness that is known to one of ordinary skill in the art. In the experimental examples shown below, alumina sandpaper comprising 180 grit and an average particle size of about 80 μm was used, because it has a known range of particle sharpness, a surface topography more consistent than concrete or asphalt, and a particle size and sharpness that produces the desired level of specimen surface damage. One non-limiting example of commercially available 180 grit sandpaper that may be used in the drop tests described herein is RHYNOWET® 180 grit alumina sandpaper produced by INDASA®.

In the tests, the sandpaper may be replaced after each drop to avoid "aging" effects that have been observed in repeated use of concrete or asphalt drop surfaces. In addition to aging, different asphalt morphologies and/or different temperatures and humidity may affect the performance of asphalt. Unlike concrete or asphalt, the sandpaper abrasive surface delivers a consistent amount of damage across all samples.

Moreover, various drop heights are utilized in the drop tests. For example, the drop test may utilize a minimum drop height to start (for example, a drop height of about 10-20 cm), and the height may be increased by set or variable increments for successive drops. Once the strengthened glass breaks, the test is stopped. Alternatively, if the drop height reaches the maximum drop height (for example, a height of about 220 cm) and the glass is not fractured upon impact, the drop test may also be stopped, or the strengthened glass article may be repeatedly dropped from that maximum height until failure occurs.

In addition to the compositional embodiments listed above, the alkali aluminosilicate glass may encompass various glass compositions as listed below.

In one embodiment, the alkali aluminosilicate glass comprises: at least one of alumina and boron oxide, and at least one of an alkali metal oxide and an alkali earth metal oxide, wherein $-15 \text{ mol }\% \leq (R_2O+R'O—Al_2O_3—ZrO_2)—B_2O_3 \leq 4$ mol %, where R is one of Li, Na, K, Rb, and Cs, and R' is one of Mg, Ca, Sr, and Ba. In some embodiments, the alkali aluminosilicate glass comprises: from about 62 mol % to about 70 mol. % $SiO_2$; from 0 mol % to about 18 mol % $Al_2O_3$; from 0 mol % to about 10 mol % $B_2O_3$; from 0 mol % to about 15 mol % $Li_2O$; from 0 mol % to about 20 mol % $Na_2O$; from 0 mol % to about 18 mol % $K_2O$; from 0 mol % to about 17 mol % MgO; from 0 mol % to about 18 mol % CaO; and from 0 mol % to about 5 mol % $ZrO_2$. The glass is described in U.S. patent application Ser. No. 12/277,573 by Matthew J. Dejneka et al., entitled "Glasses Having Improved Toughness and Scratch Resistance," filed Nov. 25, 2008, and claiming priority to U.S. Provisional Patent Application No. 61/004,677, filed on Nov. 29, 2007, the contents of which are incorporated herein by reference in their entirety.

In another embodiment, the alkali aluminosilicate glass comprises: from about 60 mol % to about 70 mol % $SiO_2$; from about 6 mol % to about 14 mol % $Al_2O_3$; from 0 mol % to about 15 mol % $B_2O_3$; from 0 mol % to about 15 mol % $Li_2O$; from 0 mol % to about 20 mol % $Na_2O$; from 0 mol % to about 10 mol % $K_2O$; from 0 mol % to about 8 mol % MgO; from 0 mol % to about 10 mol % CaO; from 0 mol % to about 5 mol % $ZrO_2$; from 0 mol % to about 1 mol % $SnO_2$; from 0 mol % to about 1 mol % $CeO_2$; less than about 50 ppm $As_2O_3$; and less than about 50 ppm $Sb_2O_3$; wherein $12 \text{ mol }\% \leq Li_2O+Na_2O+K_2O \leq 20$ mol % and 0 mol % $\leq MgO+CaO \leq 10$ mol %. The glass is described in U.S. Pat. No. 8,158,543 by Sinue Gomez et al., entitled "Fining Agents for Silicate Glasses," issued on Feb. Apr. 17, 2012, and claiming priority to U.S. Provisional Patent Application No. 61/067,130, filed on Feb. 26, 2008, the contents of which are incorporated herein by reference in their entirety.

In another embodiment, the alkali aluminosilicate glass has a seed concentration of less than about 1 seed/$cm^3$ and comprises: 60-72 mol % $SiO_2$; 6-14 mol % $Al_2O_3$; 0-15 mol % $B_2O_3$; 0-1 mol % $Li_2O$; 0-20 mol % $Na_2O$; 0-10 mol % $K_2O$; 0-2.5 mol % CaO; 0-5 mol % $ZrO_2$; 0-1 mol % $SnO_2$; and 0-1 mol % $CeO_2$, wherein $12 \text{ mol }\% \leq Li_2O+Na_2O+K_2O \leq 20$ mol %, and wherein the silicate glass comprises less than 50 ppm $As_2O_3$. In other embodiments, the silicate glass comprises: 60-72 mol % $SiO_2$; 6-14 mol % $Al_2O_3$; 0.63-15 mol % $B_2O_3$; 0-1 mol % $Li_2O$; 0-20 mol % $Na_2O$; 0-10 mol % $K_2O$; 0-10 mol % CaO; 0-5 mol % $ZrO_2$; 0-1 mol % $SnO_2$; and 0-1 mol % $CeO_2$, wherein $12 \text{ mol }\% \leq Li_2O+Na_2O+K_2O \leq 20$ mol %. In further embodiments, the silicate glass comprises: 60-72 mol % $SiO_2$; 6-14 mol % $Al_2O_3$; 0-15 mol % $B_2O_3$; 0-1 mol % $Li_2O$; 0-20 mol % $Na_2O$; 0-10 mol % $K_2O$; 0-10 mol % CaO; 0-5 mol % $ZrO_2$;

0-1 mol % $SnO_2$; and 0-1 mol % $CeO_2$, wherein 12 mol %≤$Li_2O+Na_2O+K_2O$≤20 mol %, wherein 0.1 mol %≤$SnO_2+CeO_2$≤2 mol %, and wherein the silicate glass is formed from batch or raw materials that include at least one oxidizer fining agent. The glass is described in U.S. Pat. No. 8,431,502 by Sinue Gomez et al., entitled "Silicate Glasses Having Low Seed Concentration," issued on Feb. Apr. 30, 2013, and claiming priority to U.S. Provisional Patent Application No. 61/067,130, filed on Feb. 26, 2008, the contents of which are incorporated herein by reference in their entirety.

In another embodiment, the alkali aluminosilicate glass comprises $SiO_2$ and $Na_2O$, wherein the glass has a temperature $T_{35kp}$ at which the glass has a viscosity of 35 kilo poise (kpoise), and wherein the temperature $T_{breakdown}$ at which zircon breaks down to form $ZrO_2$ and $SiO_2$ is greater than $T_{35kp}$. In some embodiments, the alkali aluminosilicate glass comprises: from about 61 mol % to about 75 mol % $SiO_2$; from about 7 mol % to about 15 mol % $Al_2O_3$; from 0 mol % to about 12 mol % $B_2O_3$; from about 9 mol % to about 21 mol % $Na_2O$; from 0 mol % to about 4 mol % $K_2O$; from 0 mol % to about 7 mol % MgO; and 0 mol % to about 3 mol % CaO. The glass is described in U.S. patent application Ser. No. 12/856,840 by Matthew J. Dejneka et al., entitled "Zircon Compatible Glasses for Down Draw," filed Aug. 10, 2010, and claiming priority to U.S. Provisional Patent Application No. 61/235,762, filed on Aug. 29, 2009, the contents of which are incorporated herein by reference in their entirety.

In another embodiment, the alkali aluminosilicate glass comprises at least 50 mol % $SiO_2$ and at least one modifier selected from the group consisting of alkali metal oxides and alkaline earth metal oxides, wherein $[(Al_2O_3 \text{ (mol \%)}+B_2O_3 \text{ (mol \%)})/(\Sigma \text{ alkali metal modifiers (mol \%)})]>1$. In some embodiments, the alkali aluminosilicate glass comprises: from 50 mol % to about 72 mol % $SiO_2$; from about 9 mol % to about 17 mol % $Al_2O_3$; from about 2 mol % to about 12 mol % $B_2O_3$; from about 8 mol % to about 16 mol % $Na_2O$; and from 0 mol % to about 4 mol % $K_2O$. The glass is described in U.S. patent application Ser. No. 12/858,490 by Kristen L. Barefoot et al., entitled "Crack And Scratch Resistant Glass and Enclosures Made Therefrom," filed Aug. 18, 2010, and claiming priority to U.S. Provisional Patent Application No. 61/235,767, filed on Aug. 21, 2009, the contents of which are incorporated herein by reference in their entirety.

In another embodiment, the alkali aluminosilicate glass comprises $SiO_2$, $Al_2O_3$, $P_2O_5$, and at least one alkali metal oxide ($R_2O$), wherein $0.75 \leq [(P_2O_5 \text{ (mol \%)}+R_2O \text{ (mol \%)})/M_2O_3 \text{ (mol \%)}] \leq 1.2$, where $M_2O_3=Al_2O_3+B_2O_3$. In some embodiments, the alkali aluminosilicate glass comprises: from about 40 mol % to about 70 mol % $SiO_2$; from 0 mol % to about 28 mol % $B_2O_3$; from 0 mol % to about 28 mol % $Al_2O_3$; from about 1 mol % to about 14 mol % $P_2O_5$; and from about 12 mol % to about 16 mol % $R_2O$; and, in certain embodiments, from about 40 to about 64 mol % $SiO_2$; from 0 mol % to about 8 mol % $B_2O_3$; from about 16 mol % to about 28 mol % $Al_2O_3$; from about 2 mol % to about 12% $P_2O_5$; and from about 12 mol % to about 16 mol % $R_2O$. The glass is described in U.S. patent application Ser. No. 13/305,271 by Dana C. Bookbinder et al., entitled "Ion Exchangeable Glass with Deep Compressive Layer and High Damage Threshold," filed Nov. 28, 2011, and claiming priority to U.S. Provisional Patent Application No. 61/417,941, filed Nov. 30, 2010, the contents of which are incorporated herein by reference in their entirety.

In still other embodiments, the alkali aluminosilicate glass comprises at least about 4 mol % $P_2O_5$, wherein $(M_2O_3 \text{ (mol \%)})/R_xO \text{ (mol \%)})<1$, wherein $M_2O_3=Al_2O_3+B_2O_3$, and wherein $R_xO$ is the sum of monovalent and divalent cation oxides present in the alkali aluminosilicate glass. In some embodiments, the monovalent and divalent cation oxides are selected from the group consisting of $Li_2O$, $Na_2O$, $K_2O$, $Rb_2O$, $Cs_2O$, MgO, CaO, SrO, BaO, and ZnO. In some embodiments, the glass comprises 0 mol % $B_2O_3$. The glass is described in U.S. patent application Ser. No. 13/678,013 by Timothy M. Gross, entitled "Ion Exchangeable Glass with High Crack Initiation Threshold," filed Nov. 15, 2012, and claiming priority to U.S. Provisional Patent Application No. 61/560,434 filed Nov. 16, 2011, the contents of which are incorporated herein by reference in their entirety.

In other embodiments, the alkali aluminosilicate glass comprises at least about 50 mol % $SiO_2$ and at least about 11 mol % $Na_2O$, and the compressive stress is at least about 900 MPa. In some embodiments, the glass further comprises $Al_2O_3$ and at least one of $B_2O_3$, $K_2O$, MgO and ZnO, wherein $-340+27.1.Al_2O_3-28.7.B_2O_3+15.6.Na_2O-61.4.K_2O+8.1.(MgO+ZnO) \geq 0$ mol %. In particular embodiments, the glass comprises: from about 7 mol % to about 26 mol % $Al_2O_3$; from 0 mol % to about 9 mol % $B_2O_3$; from about 11 mol % to about 25 mol % $Na_2O$; from 0 mol % to about 2.5 mol % $K_2O$; from 0 mol % to about 8.5 mol % MgO; and from 0 mol % to about 1.5 mol % CaO. The glass is described in U.S. patent application Ser. No. 13/533,298, by Matthew J. Dejneka et al., entitled "Ion Exchangeable Glass with High Compressive Stress," filed Jun. 26, 2012, and claiming priority to U.S. Provisional Patent Application No. 61/503,734, filed Jul. 1, 2011, the contents of which are incorporated herein by reference in their entirety.

In some embodiments, the glass comprises: at least about 50 mol % $SiO_2$; at least about 10 mol % $R_2O$, wherein $R_2O$ comprises $Na_2O$; $Al_2O_3$; and $B_2O_3$, wherein $B_2O_3-(R_2O-Al_2O_3) \geq 3$ mol %. In certain embodiments, the glass comprises: at least about 50 mol % $SiO_2$; from about 9 mol % to about 22 mol % $Al_2O_3$; from about 3 mol % to about 10 mol % $B_2O_3$; from about 9 mol % to about 20 mol % $Na_2O$; from 0 mol % to about 5 mol % $K_2O$; at least about 0.1 mol % MgO, ZnO, or combinations thereof, wherein 0≤MgO≤6 and 0≤ZnO≤6 mol %; and, optionally, at least one of CaO, BaO, and SrO, wherein 0 mol %≤CaO+SrO+BaO≤2 mol %. When ion exchanged, the glass, in some embodiments, has a Vickers crack initiation threshold of at least about 10 kgf. Such glasses are described in U.S. patent application Ser. No. 13/903,433, by Matthew J. Dejneka et al., entitled "Zircon Compatible, Ion Exchangeable Glass with High Damage Resistance," filed May 28, 2013, and claiming priority to U.S. Provisional Patent Application No. 61/653,489, filed May 31, 2012, the contents of which are incorporated by reference herein in their entirety.

In some embodiments, the glass comprises: at least about 50 mol % $SiO_2$; at least about 10 mol % $R_2O$, wherein $R_2O$ comprises $Na_2O$; $Al_2O_3$, wherein −0.5 mol %≤$Al_2O_3$ (mol %)-$R_2O$ (mol %)≤2 mol %; and $B_2O_3$, and wherein $B_2O_3$ (mol %)-($R_2O$ (mol %)-$Al_2O_3$ (mol %))≥4.5 mol %. In other embodiments, the glass has a zircon breakdown temperature that is equal to the temperature at which the glass has a viscosity of greater than about 40 kPoise and comprises: at least about 50 mol % $SiO_2$; at least about 10 mol % $R_2O$, wherein $R_2O$ comprises $Na_2O$; $Al_2O_3$; and $B_2O_3$, wherein $B_2O_3$ (mol %)-($R_2O$ (mol %)-$Al_2O_3$ (mol %))≥4.5 mol %. In still other embodiments, the glass is ion exchanged, has a Vickers crack initiation threshold of at least about 30 kgf, and comprises: at least about 50 mol % $SiO_2$; at least about 10 mol % R$_2$O, wherein R$_2$O comprises Na$_2$O; Al$_2$O$_3$, wherein −0.5 mol %≤Al$_2$O$_3$ (mol %)-R$_2$O (mol %)≤2 mol %; and B$_2$O$_3$, wherein B$_2$O$_3$ (mol %)-(R$_2$O (mol %)-Al$_2$O$_3$ (mol %))≥4.5 mol %. Such glasses are described in U.S. patent application Ser. No. 13/903,398 by Matthew J. Dejneka et al., entitled "Zircon Compatible, Ion Exchangeable Glass with High Damage Resistance," filed May 28, 2013, and claiming priority to U.S. Provisional Patent Application No. 61/653,485, filed May 31, 2012, the contents of which are incorporated by reference herein in their entirety.

In some embodiments, the alkali aluminosilicate glasses described hereinabove are substantially free of (i.e., contain 0 mol % of) at least one of boron, barium, strontium, bismuth, antimony, and arsenic.

In addition to those compositions listed above, various other alkali aluminosilicate glass compositions may be used as cover glass in accordance with the present disclosure. Incorporating components and amounts from various embodiments described above is contemplated and considered within the scope of the present disclosure.

As stated above, the glass articles may be chemically strengthened by ion exchange. In this process, ions in the surface layer of the glass are replaced by—or exchanged with—larger ions having the same valence or oxidation state. In those embodiments in which the glass article comprises, consists essentially of, or consists of an alkali aluminosilicate glass, ions in the surface layer of the glass and the larger ions are monovalent alkali metal cations, such as Li$^+$ (when present in the glass), Na$^+$, K$^+$, Rb$^+$, and Cs$^+$. Alternatively, monovalent cations in the surface layer may be replaced with monovalent cations other than alkali metal cations, such as Ag$^+$ or the like.

Ion exchange processes are typically carried out by immersing a glass article in a molten salt bath containing the larger ions to be exchanged with the smaller ions in the glass. It will be appreciated by those skilled in the art that parameters for the ion exchange process, including, but not limited to, bath composition and temperature, immersion time, the number of immersions of the glass in a salt bath (or baths), use of multiple salt baths, additional steps such as annealing, washing, and the like, are generally determined by the composition of the glass and the desired depth of layer and compressive stress of the glass that result from the strengthening operation. By way of example, ion exchange of alkali metal-containing glasses may be achieved by immersion in at least one molten bath containing a salt such as, but not limited to, nitrates, sulfates, and chlorides of the larger alkali metal ion. The temperature of the molten salt bath typically is in a range from about 380° C. up to about 450° C., while immersion times range from about 15 minutes up to about 40 hours. However, temperatures and immersion times different from those described above may also be used.

In addition, non-limiting examples of ion exchange processes in which glass is immersed in multiple ion exchange baths, with washing and/or annealing steps between immersions, are described in U.S. patent application Ser. No. 12/500,650, filed Jul. 10, 2009, by Douglas C. Allan et al., entitled "Glass with Compressive Surface for Consumer Applications" and claiming priority from U.S. Provisional Patent Application No. 61/079,995, filed Jul. 11, 2008, in which glass is strengthened by immersion in multiple, successive, ion exchange treatments in salt baths of different concentrations; and U.S. Pat. No. 8,312,739, by Christopher M. Lee et al., issued on Nov. 20, 2012, and entitled "Dual Stage Ion Exchange for Chemical Strengthening of Glass," and claiming priority from U.S. Provisional Patent Application No. 61/084,398, filed Jul. 29, 2008, in which glass is strengthened by ion exchange in a first bath is diluted with an effluent ion, followed by immersion in a second bath having a smaller concentration of the effluent ion than the first bath. The contents of U.S. patent application Ser. No. 12/500,650 and U.S. Pat. No. 8,312,739 are incorporated herein by reference in their entirety. Further, the glass compositions of the present disclosure are down-drawable by processes known in the art, such as slot-drawing, fusion drawing, re-drawing, and the like, and have a liquidus viscosity of at least 130 kilopoise.

The compressive stress is created by chemically strengthening the glass article, for example, by the ion exchange processes, previously described herein, in which a plurality of first metal ions in the outer region of the glass article is exchanged with a plurality of second metal ions so that the outer region comprises the plurality of the second metal ions. Each of the first metal ions has a first ionic radius and each of the second alkali metal ions has a second ionic radius. The second ionic radius is greater than the first ionic radius, and the presence of the larger second alkali metal ions in the outer region creates the compressive stress in the outer region.

At least one of the first metal ions and second metal ions are preferably ions of an alkali metal. The first ions may be ions of lithium, sodium, potassium, and rubidium. The second metal ions may be ions of one of sodium, potassium, rubidium, and cesium, with the proviso that the second alkali metal ion has an ionic radius greater than the ionic radius than the first alkali metal ion.

Figure 6:
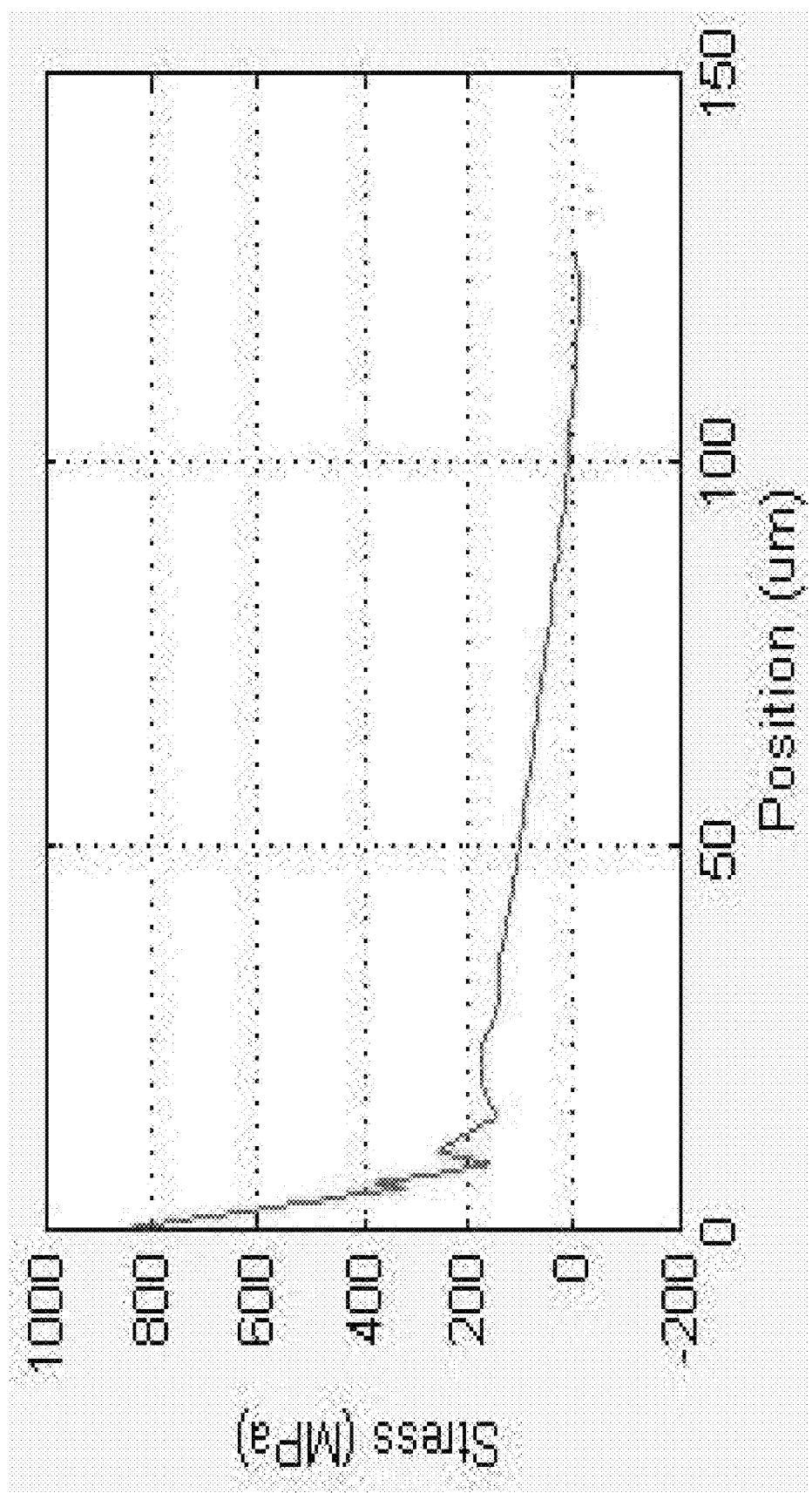
FIG. 6 is a graphical illustration of the stress profile of a 1 mm thick strengthened glass having a $CS_s$ of 897 MPa and a DOL of 108 μm according to one or more embodiments of the present disclosure.

Referring to the prophetic example of FIG. 8, a strengthened glass article may have a stress profile defined by a first compressive zone (Zone 1) which extends from the surface of the glass to a distance x below the surface, and a second compressive stress zone (Zone 2) extending from the distance x to the DOL. The first compressive zone defines a rate r1 of decrease of compressive stress from the surface to the distance x below the surface, and the second compressive zone defines a rate r2 of decrease of compressive stress from the distance x to the DOL, and r1≥2r2. Without being bound by theory, the first compressive stress zone is achieved by an ion exchange step directed to deliver a spike of compressive stress near the surface, whereas the second compressive zone is achieved by a separate, subsequent ion exchange step directed to deliver a deeper DOL in the glass. As described below, the stress profile of FIG. 6 depicts a stress profile of glass article chemically strengthened via such double ion exchange.

In a further embodiment of the present disclosure, a method of producing a strengthened glass article having a thickness t≤1 mm and at least one compressive stress layer extending from a surface of the strengthened glass article to a depth of layer DOL (in μm)≥70 μm is provided. The method includes a first ion exchange step wherein an alkali aluminosilicate glass article is immersed in a first ion exchange bath at a temperature of greater than 400° C. for a time sufficient such that the compressive stress layer has a depth of at least 70 μm after the first ion exchange step.

While various time periods are contemplated as suitable, the first ion exchange step may be conducted for a time of at least 8 hours. Without being bound by theory, longer ion exchange periods for the first ion exchange step may correlate with larger sodium ion content in the first ion exchange bath. For example and not by way of limitation, the desired sodium ion content in first ion exchange bath may be achieved by including at least about 30% by weight of a sodium composition, or at least about 40% by weight in the first ion exchange bath, or optionally including a range of about 30% to about 60% by weight of the sodium composition in the first ion exchange bath. In an exemplary embodiment, the sodium composition is $NaNO_3$. In a further embodiment, the temperature of the first ion exchange step may be 435° C. or greater.

After the first ion exchange step is performed, the strengthened glass article may have a compressive stress (CS) of at least 150 MPa. In further embodiments, the strengthened glass article may have a CS of at least 200 MPa after the first ion exchange step, or a CS range of about 200 to about 400 MPa after the first ion exchange step. While the first ion exchange step minimally achieves a compressive layer depth of at least 70 µm, the compressive stress layer may, in some embodiments, have a depth of 70-85 µm after the first ion exchange step.

After completion of the first ion exchange step, the second ion exchange step may be conducted by immersing the alkali aluminosilicate glass article in a second ion exchange bath different from the first ion exchange bath at a temperature of at least 350° C. for a time sufficient to produce the compressive layer having DOL≥70 µm.

Figure 8:
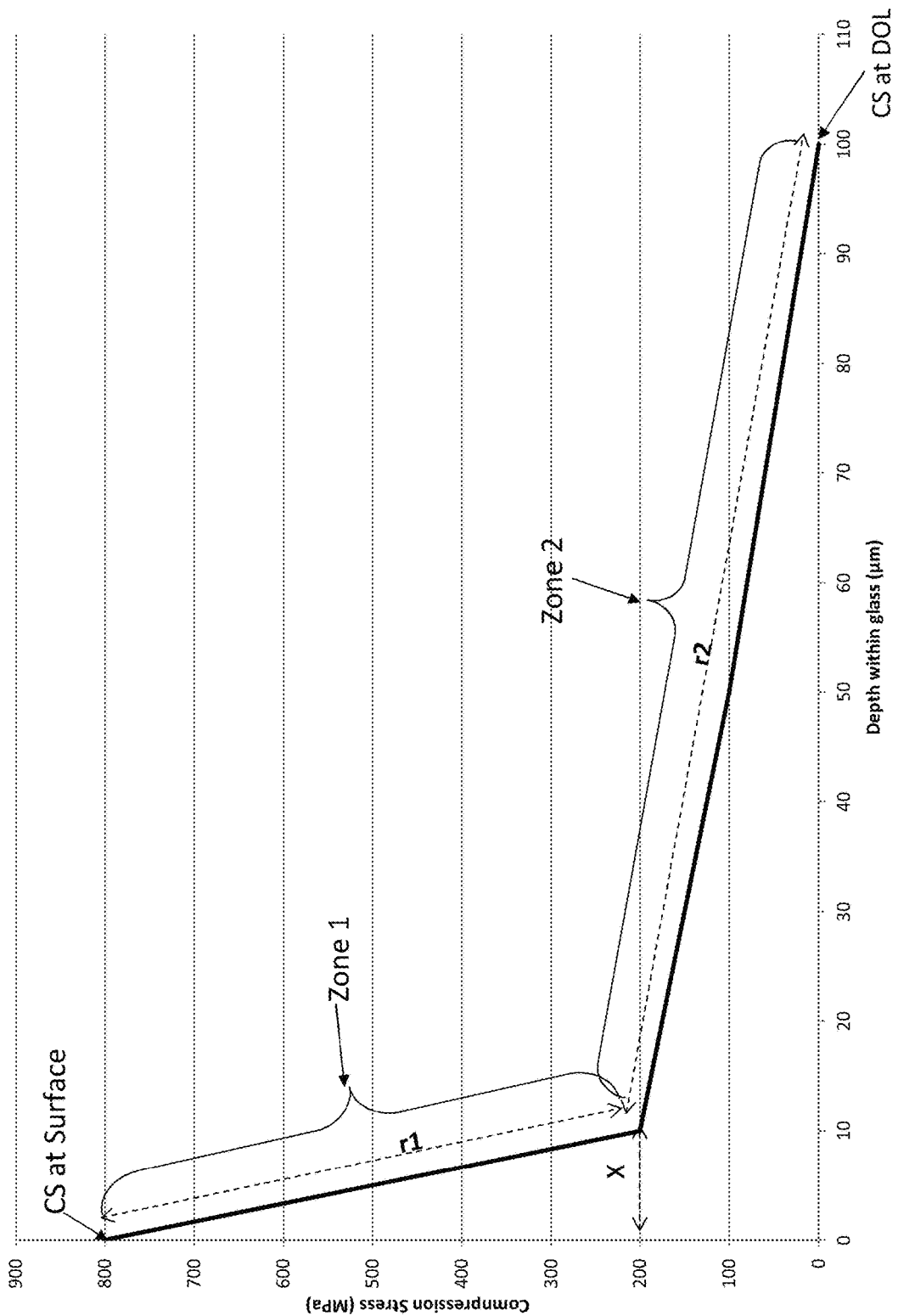
FIG. 8 is a graphical illustration depicting an exemplary double ion exchange stress profile according to one or more embodiments of the present disclosure.

Without being bound by theory, the second ion exchange step is considered to be a rapid ion exchange step that yields a "spike" of compressive stress near the surface of the glass as depicted in FIG. 8. In one or more embodiments, the second ion exchange step may be conducted for a time of 75 minutes or less, or for a time of 30 minutes or less, or for a time of 15 minutes or less, or optionally may be conducted in a range of about 10 to about 20 minutes.

Further without being bound by theory, the second ion exchange bath is different than the first ion exchange bath, because the second ion exchange step is directed to delivering a different ion to the alkali aluminosilicate glass article than the first ion exchange step. In one or more embodiments, the second ion exchange bath may comprise at least about 95% by weight of a potassium composition that delivers potassium ions to the alkali aluminosilicate glass article. In a specific embodiment, the second ion exchange bath may comprise from about 98% to about 99.5% by weight of the potassium composition. While it is possible that the second ion exchange bath only comprises a potassium composition, the second ion exchange bath may, in further embodiments, comprise 0-2% by weight, or about 0.5-1.5% by weight of a sodium composition, for example, $NaNO_3$. In an exemplary embodiment, the potassium composition is $KNO_3$. In further embodiments, the temperature of the second ion exchange step may be 360° C. or greater or, in some embodiments, 390° C. or greater.

After the second ion exchange step, which may conclude the chemical strengthening procedure, the strengthened glass article may have a compressive stress (CS) of at least 700 MPa. In a further embodiment, the strengthened glass article has a compressive stress of about 700 to about 1200 MPa, or about 700 to 1000 MPa after the second ion exchange step. While the second ion exchange step minimally achieves a compressive layer DOL of at least 70 µm, it is contemplated that the compressive stress layer may have a DOL in a range of about 70 µm to about 100 µm after the second ion exchange step.

For illustration, an exemplary double ion exchange procedure performed on alkali aluminosilicate glass samples having a thickness of 0.5 mm is provided below. The compositions of these alkali aluminosilicate glass samples are disclosed in U.S. application Ser. No. 13/305,271, and are also included in paragraph [0061] above. The first ion exchange step utilized an ion exchange bath comprising 43-52% $NaNO_3$ by weight, and was conducted for a time period greater than 8 hours at a temperature of approximately 450° C. The second exchange step utilized an ion exchange bath comprising 0-1.4% $NaNO_3$ by weight and the remainder being $KNO_3$. The second ion exchange step was conducted for a period of 11-14 minutes, and 13-14 minutes in specific instances.

The compression layer depth after this first ion exchange step ranged from about 72 to about 83 microns, and the compressive stress was approximately 215-265 MPa. After both steps of the double ion exchange are performed, the exemplary glass included a DOL range of approximately 100-126 um, and a CS range of about 760 to 960 MPa. In these glass examples, the depth of the stress spike, which is the depth within the glass where the CS value is half of the peak CS at the surface, was about 5.5-7 µm from the surface of the glass article.

Drop Test Procedure

The following description lists a detailed procedural framework previously utilized to perform sandpaper drop tests.

Drop Test Equipment

Figure 11:
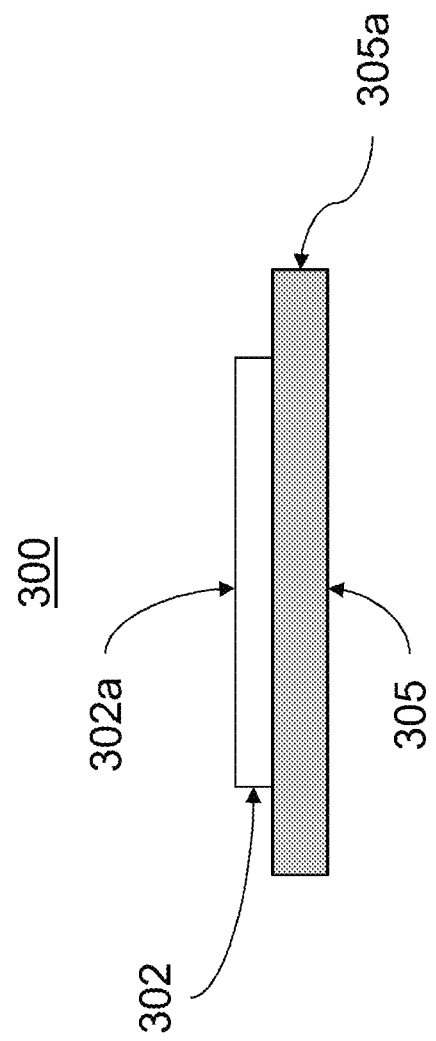
FIG. 11 is a schematic cross-sectional view of a test device with a strengthened cover glass attached.

For the drop tests, a Yoshida Seiki DT-205 Drop Test System was utilized and was oriented to fully contact but not be secured to a painted concrete floor. Referring to FIGS. 11 and 12, the steel base plate 320 was ~¾" thick and stock rectangular polymer jaws 340 with vertical parallel faces 340a were utilized. The jaws 340 were supported by a stand (not shown) that held the test device with strengthened glass sample 300 at a distance d above the drop surface 313. A cross-sectional view of a test device with a strengthened cover glass attached 300 is schematically shown in FIG. 11. The test devices 305 were commercially available smartphones retrofitted with the strengthened cover glass 302 of the present disclosure such that the glass sat "proud (i.e., above the bezel and not recessed in the frame of the phone) so that the strengthened cover glass sample 302 sits "proud"—i.e., above the bezel and not recessed in the frame of the phone such that the exposed surface 302a of the strengthened glass sample 302 is equidistant from the bezel along the full perimeter of the phone. Drop tests using as-manufactured phones produced results comparable to those of the retrofitted glass samples, and thus confirmed that the drop tests described above were truly representative of damage incurred in normal use.

Drop Surface Preparation

A cross-sectional view of the drop test surface 313 and the structure supporting it is schematically shown in FIG. 12. For drop surface preparation, two pieces of 9×11" RHYNOWET 180 grit alumina sandpaper were used. A first piece of sandpaper 310 having an abrasive surface 310a was centered below the drop tester jaws and the back surface 310b was fully adhered to the steel base plate 320 of the drop tester with a thin layer of SCOTCH SPRAY MOUNT™ contact adhesive 315 to prevent lateral movement of the actual drop surface. The adhesive was allowed to dry thoroughly to ensure that the first piece of sandpaper 310 did not buckle or shift during the drop test.

A second piece of sandpaper 312, which forms the actual drop surface 313, was aligned to fully cover the first piece of sandpaper 310 with the abrasive side 312a facing upward, without adhesive being used to secure the first piece 312 to the second piece 310 of sandpaper. Instead, the second piece of sandpaper 312 was held in place with four strong, rare earth magnets 330 in each corner. Each magnet 330 was covered with a polymer fingertip (not shown) cut from a cut-resistant glove to prevent contact damage to the cover glass if the device bounced to the side.

The same second sheet of sandpaper 312 was used for the entire drop sequence of an individual test device with glass attached 300. A new second piece of sandpaper 312 was used to test each test device with glass attached 300.

The test device with glass attached 300 was loaded into the drop tester jaws 340 with the glass 302 facing downward and parallel to the plane of the drop surface (a in FIG. 12). To ensure a smooth release, the jaws 340 did not contact any buttons or other physical phone features that extend beyond the contact surface of the test device edges 305a. The jaws 340 only contacted the opposite long edges 305a of the drop test device. The test device edges 305a were aligned to contact the vertical midpoints of the jaws 340, which were in turn centered on the jaw air piston actuators (not shown). This minimized the potential for any variable non-normal forces and protected against extraneous or variable forces that could be imparted to the test device Drop Test Drop tests were performed under ambient conditions (air, room temperature). The first drop was performed at a starting height of 20 cm, which represented the distance from the exposed surface of the cover glass 302a to the top of the drop surface 313. If no cover glass failure occurred, the drop height was increased by 10 cm, and the test device with glass sample 300 was aligned within the jaws 340 and dropped again. The test device with glass sample 300 was sequentially dropped at 10 cm increments (e.g., 10 cm, then 20 cm, then 30 cm, etc.) until the cover glass 302 failed or until the cover glass 302 survived the maximum drop height of 220 cm.

For the next individual device to be drop tested, the magnets 330 and the used top piece of alumina sandpaper 312 were removed. The steel drop tester base plate 320 and the bottom first piece of alumina sandpaper 310 were cleaned with a brush and then subjected to compressed air to remove loose contaminants such as, for example, particles freed from the sandpaper surface or glass fragments. At which point, the above drop procedure was performed again.

The attitude of the strengthened glass sample 302 and test device 305 was adjusted such that the surface 302a of the strengthened glass sample 302 contacted the drop surface 313 at either a flat angle or at a non-flat angle. As used herein, "flat angle" means parallel to the plane (a in FIG. 12) of the drop surface 313, whereas "non-flat angle" refers to an orientation at an acute angle (e.g., b and θ in FIG. 12) with the plane a of the drop surface 313. In the examples below, the non-flat angle θ is 30° relative to plane and the drop surface 313.

To determine the survivability rate of the strengthened glass article when dropped from a predetermined height, the drop test equipment and drop surface preparation described hereinabove are used. At least five identical samples of the strengthened glass are tested, and large numbers (e.g., 10, 20, 30, etc.) of samples may be subject to testing. Each sample is dropped a single time from the predetermined height (e.g., 100 cm) and visually (i.e., with the naked eye) examined for evidence of fracture (crack formation and propagation across the entire thickness and/or entire surface of a sample. A sample is deemed to have "survived" the drop test if no fracture is observed after being dropped. The survivability rate is determined to be the percentage of the sample population that survived the drop test. For example, if 7 samples out of a group of 10 did not fracture when dropped, the survivability rate would be 70%.

EXAMPLES

The following examples (Examples 1-3) demonstrate the improved survivability of strengthened alkali aluminosilicate glasses having a DOL≥70 μm by comparison to shallower DOL glasses conventionally used in cover glass.

Example 1

In the comparative examples, the glass used as a basis for the comparison in the control and experimental glasses below had the following composition in wt %:58.5% $SiO_2$, 21.51% $Al_2O_3$, 5.2% $B_2O_3$, 13.01% $Na_2O$, 0.02% $K_2O$, 1.51% MgO, 0.03% CaO, and 0.18% $SnO_2$.

As shown in Table 1 below, the control strengthened glass was ion exchanged for 5 hours at 430° in a $KNO_3$ bath to yield a $CS_s$=805 MPa, and a DOL=40 μm. The experimental strengthened glass was ion exchanged for 27 hours at 450° in a $KNO_3$ bath to yield a $CS_s$=376 MPa, and a DOL=97 μm in accordance with the present disclosure. These $CS_s$ and DOL values were computed using FSM. The test method was initially performed beginning at a height of 20 cm and was increased at 10 cm increments for subsequent drops until reaching a maximum height of 220 cm. The drop height for failure was recorded as a metric for both angled drops and flat face drops. The drop surface was a 180 grit alumina sandpaper upper surface disposed on a steel plate. In the tests, the strengthened glass was installed into a commercial smartphone device to best simulate real world dropping conditions. The 30 degree drop and flat (180 degree) drop were oriented with the glass being tested on the device facing the drop surface during impact, so that it was the first surface to make contact with the drop surface.

TABLE 1

| | Control Strengthened Glass | Experimental Strengthened Glass |
|---|---|---|
| DOL | 40 | 97 |
| Ion Exchange Time (hrs) | 5 | 27 |
| Ion Exchange Temperature (° C.) | 430 | 450 |
| Na concentration in $KNO_3$ bath (wt %) | 2% | 29% |

Figure 9:
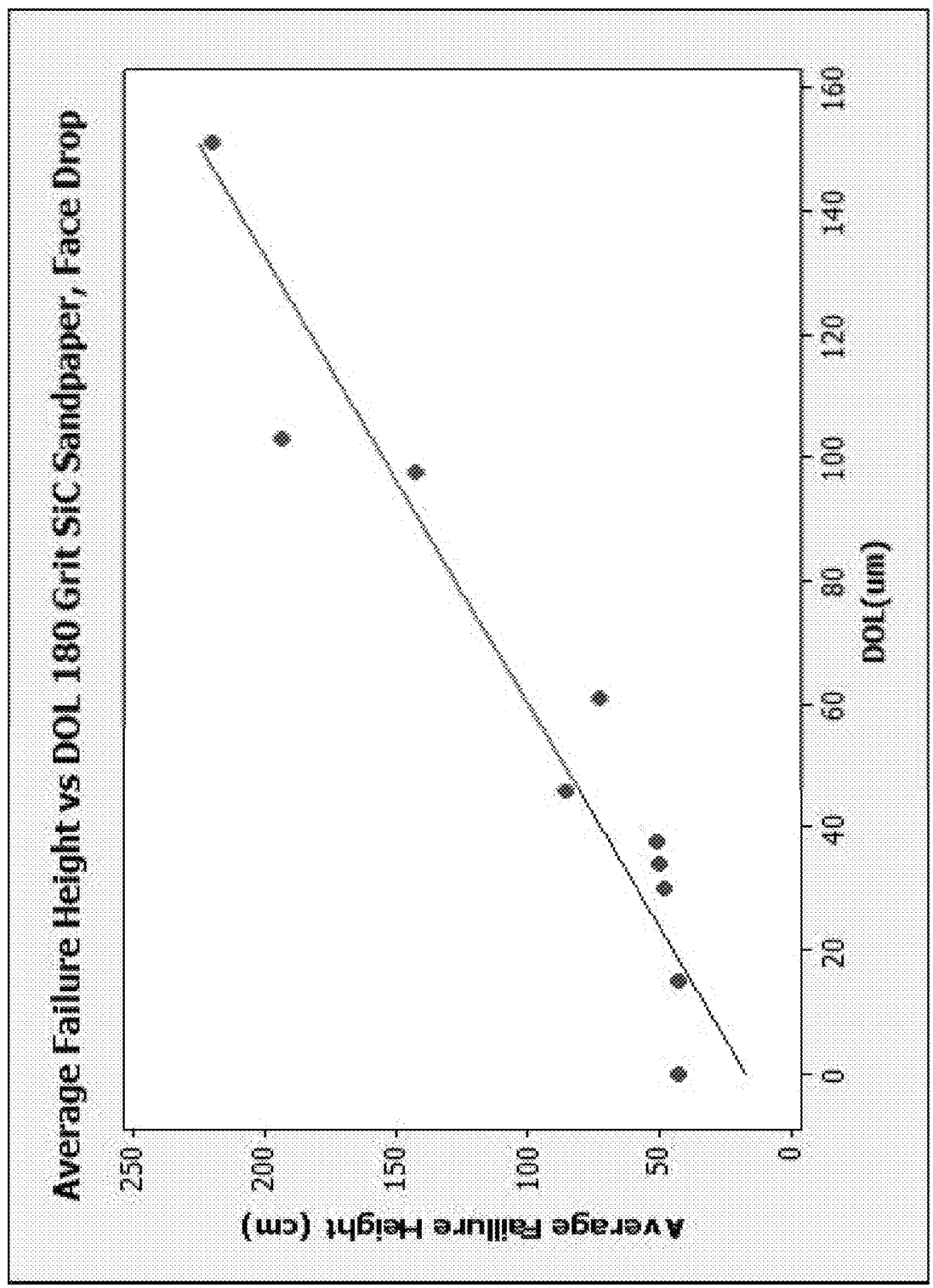
FIG. 9 is a graphical illustration which illustrates the drop height failure for strengthened glass articles having various DOL values according to one or more embodiments of the present disclosure

As shown in Table 2 below and plotted in FIG. 9, strengthened glass with a DOL of 40 μm experienced cover glass fracture at drop heights of 102.5 cm on average for the flat face drop test and 114 cm for the 30° drop tests. However, strengthened glass with a DOL of 97 μm was subjected to 4 drops at 220 cm in the flat face drop tests and 5 drops at 220 cm in the 30° drop tests, and the strengthened glass did not experience cover glass fracture or failure.

TABLE 2

| DOL | Flat Face Drop Avg. Break Height (cm) | 30 Degree Drop Avg. Break Height (cm) |
|---|---|---|
| 40 | 102.5 | 114 |
| 97 | No Breakage at 220 cm | No Breakage at 220 cm |

Example 2

Additionally, another drop test experiment was conducted for a strengthened glass having a DOL=151 using the same procedure as that used in Example 1. The strengthened glass composition in wt % was approximately: 47.93% $SiO_2$, 23.31% $Al_2O_3$, 12.73 $P_2O_5$, 14.37% $Na_2O$, 1.56% MgO, and 0.11% $SnO_2$. The glass was ion exchanged to yield approximately a $CS_s$=232 MPa, and a DOL=151 μm as computed via FSM. The strengthened glass had a 1 mm thickness and was incorporated into a smartphone device. Upon conducting the same drop testing procedure as that used in Example 1, the glass survived 5 flat face drops at a 220 cm height, and also survived 5 30° angle drops at a 220 cm height.

Example 3

In this example, an exemplary 3D shape glass having a thickness of 0.8 mm, dimensions of 55.9 mm×121.0 mm, and a bend radius of 3 mm was tested. The glass had a composition in wt % as follows: 61.22% $SiO_2$, 16.03 wt % $Al_2O_3$, 0.62% $B_2O_3$, 13.85% $Na_2O$, 3.55% $K_2O$, 3.7% MgO, 0.5% CaO, 0.52% $SnO_2$, and 0.1% $ZrO_2$.

The glass underwent a single ion exchange to yield a $CS_s$=787 MPa and a DOL=95 μm as computed via FSM. Flat face drop tests were performed starting at a 30 cm drop height with increasing increments of 10 cm up to a max height of 200 cm. The glass was dropped 4 times from a 200 cm height and demonstrated no breakage or fracture.

Example 4

Figure 5:
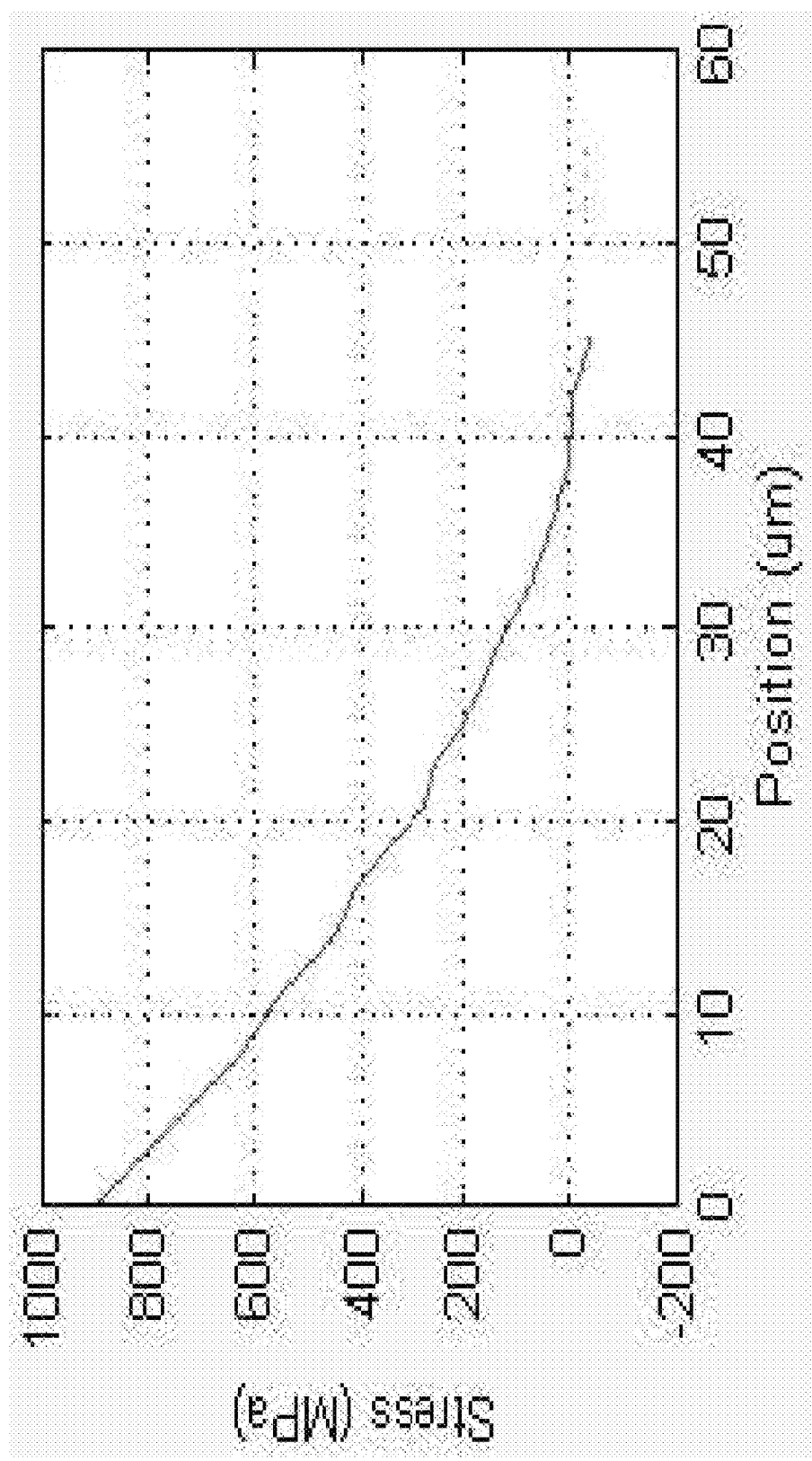
FIG. 5 is a graphical illustration of the stress profile of a 1 mm thick strengthened glass having a compressive stress at the surface $CS_s$ of 901 MPa and a DOL of 40 μm.
Figure 7:
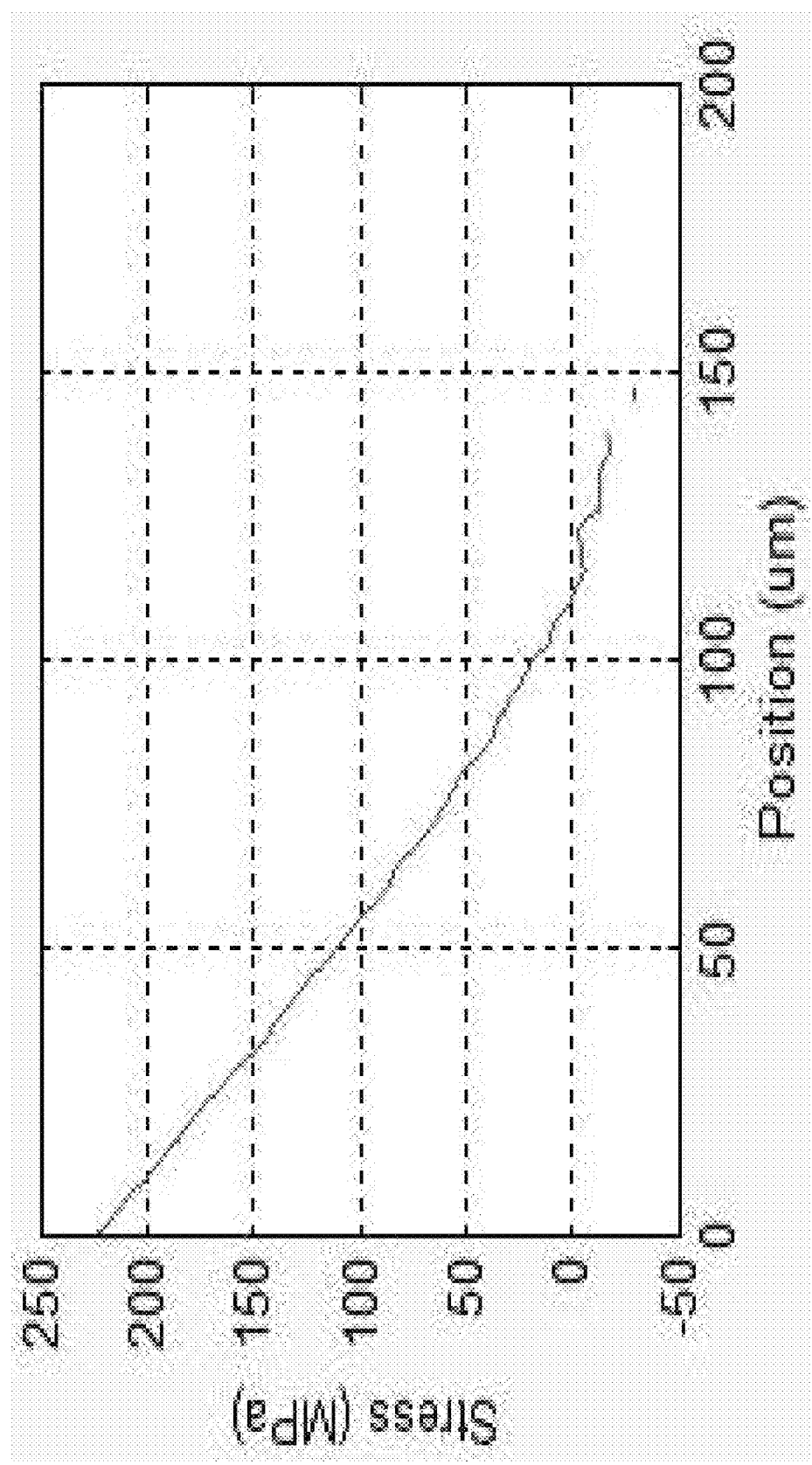
FIG. 7 is a graphical illustration of the stress profile of a 1 mm thick strengthened glass having a $CS_s$ of 225 MPa and a DOL of 112 μm according to one or more embodiments of the present disclosure.

As further illustration, FIGS. 6 and 7 show stress profiles of 1 mm thick strengthened alkali aluminosilicate glass article samples having a deeper DOL (i.e., DOL≥70 μm) in contrast to the lower DOL glass sample (DOL=40 μm) of FIG. 5. As stated above, the stress profile curves were plotted using the Roussev technique.

FIG. 6 depicts a strengthened glass article having a compressive stress spike on the surface. The strengthened glass article, which has a $CS_s$ of 897 MPa and a DOL of 108 μm, has a compressive stress $CS_D$ of about 100 MPa at a depth of 50 μm. As noted above, FIG. 6 is a double ion exchanged glass article which includes a compressive stress spike near the surface of the glass.

Unlike FIG. 6, which depicts the stress profile of a double ion exchanged strengthened glass articles with a compressive stress spike at the surface, the strengthened glass article of FIG. 7 is a single ion exchanged glass having a $CS_s$ of 225 MPa and a DOL of 112 μm, and includes a $CS_D$ of about 110 MPa at a CD of 50 μm.

While typical embodiments have been set forth for the purpose of illustration, the foregoing description should not be deemed to be a limitation on the scope of the disclosure or appended claims.

For example, processes other than ion exchange may be used to chemically strengthen the glass, and different means of strengthening the glass may be used in combination with each other to achieve compressive stress within the glass. In one alternative embodiment, metal ions, such as silver or the like, may be used instead of—or in combination with—alkali metal ions in the ion exchange process. Accordingly, various modifications, adaptations, and alternatives may occur to one skilled in the art without departing from the spirit and scope of the present disclosure or appended claims.

The invention claimed is:
1. A strengthened glass article comprising:
a thickness t≤1 mm,
an inner region under a central tension CT, and
at least one compressive stress layer adjacent the inner region and extending within the strengthened glass article from a surface of the strengthened glass article to a depth of layer DOL, wherein the DOL is greater than or equal to 70 μm,
wherein the strengthened glass article is under a compressive stress at the surface CSs,
wherein the strengthened glass article is an alkali aluminosilicate glass article comprising 0 mol % Li2O, and at least 3 mol % Al2O3, and
wherein the strengthened glass article has a stress profile such that a compressive stress CSD at an intermediate critical depth of 50 μm below the surface of the strengthened glass article is at least 10% of CSs.

2. The strengthened glass article of claim 1, wherein the CSs>300 MPa.

3. The strengthened glass article of claim 1, wherein the strengthened glass article comprises 0-5 mol % K2O.

4. The strengthened glass article of claim 1, wherein the thickness t≤0.9 mm.

5. The strengthened glass article of claim 1, wherein CSD is at least 50 MPa.

6. The strengthened glass article of claim 1, wherein the strengthened glass article comprises from 5 mol % to 20 mol % Na2O.

7. The strengthened glass article of claim 1, wherein the strengthened glass article comprises from 0 mol % to 10 mol % MgO.

8. The strengthened glass article of claim 1, wherein the CSs/DOL ratio is in a range from 8 MPa/μm to 10 MPa/μm.

9. The strengthened glass article of claim 1, wherein the DOL is in a range from 0.1t to 0.2t.

10. The strengthened glass article of claim 1, wherein the DOL is in a range from 70 to 120 μm.

11. The strengthened glass article of claim 1, wherein the CSs is in a range from 700 to 1200 MPa.

12. The strengthened glass article of claim 1, wherein the thickness t is in a range from about 0.4 mm to about 0.8 mm.

13. The strengthened glass article of claim 1, wherein the CT is less than or equal to 150 MPa.

14. The strengthened glass article of claim 1, wherein the CSs/DOL ratio is in a range from 3 MPa/μm to 12 MPa/μm.

15. The strengthened glass article of claim 14, wherein the CSs/DOL ratio is in a range from 3 MPa/μm to 5 MPa/μm.

16. The strengthened glass article of claim 1, wherein the strengthened glass article has a stress profile defined by a first compressive stress zone which extends from the surface of the strengthened glass article to a distance x below the surface, and a second compressive stress zone extending from the distance x to the DOL, and
wherein the first compressive stress zone defines a rate r1 of decrease of compressive stress from the surface to the distance x below the surface, the second compressive stress zone defines a rate r2 of decrease of compressive stress from the distance x to the DOL, and wherein r1≥2r2.

17. The strengthened glass article of claim 1, wherein the CSs≥350 MPa.

18. The strengthened glass article of claim 1, wherein the strengthened glass has at least a 60% survival rate when dropped in a drop test from a height of at least 100 cm onto a drop surface comprising 180 grip alumina sandpaper utilizing a uniform drop rate procedure, wherein the survival rate is based on testing at least 5 samples.

19. The strengthened glass of claim 18, wherein the strengthened glass is incorporated into an electronic device.

20. The strengthened glass article of claim 1, wherein CSs/DOL≥2.5 MPa/μm.

21. A method of producing the strengthened glass article according to claim 1, having a thickness t≤1 mm and at least one compressive stress layer extending from a surface of the strengthened glass article to a depth of layer DOL which is great than or equal 70 μm, the method comprising:
conducting a first ion exchange step by immersing an alkali aluminosilicate glass article in a first ion exchange bath at a temperature of greater than 400° C. for a time sufficient such that the compressive stress layer has a depth of at least 70 μm after the first ion exchange step; and
conducting a second ion exchange step by immersing the alkali aluminosilicate glass article in a second ion exchange bath different from the first ion exchange bath at a temperature of at least 350° C. for a time sufficient to produce the compressive stress layer having DOL, wherein the strengthened glass article has a stress profile such that a compressive stress $CS_D$ at an intermediate critical depth of 50 μm below the surface of the strengthened glass article is at least 10% of a compressive stress at the surface CSs, and wherein the strengthened glass article comprises 0 mol % $Li_2O$.

22. The method of claim 21, wherein the first ion exchange step is conducted for a time of at least 8 hours.

23. The method of claim 21, wherein the first ion exchange bath comprises at least about 30% by weight of a sodium composition that delivers sodium ions to the alkali aluminosilicate glass article.

24. The method of claim 23, wherein the first ion exchange bath comprises from about 30% to about 60% by weight of the sodium composition.

25. The method of claim 21, wherein the temperature of the first ion exchange step is 435° C. or greater.

26. The method of claim 21, wherein the strengthened glass article has a compressive stress of at least 150 MPa after the first ion exchange step.

27. The method of claim 26, wherein the strengthened glass article has a compressive stress of about 200 to about 400 MPa after the first ion exchange step.

28. The method of claim 21, wherein the second ion exchange step is conducted for a time of 75 minutes or less.

29. The method of claim 28, wherein the second ion exchange step is conducted for a time of about 10 to about 20 minutes.

30. The method of claim 21, wherein the second ion exchange bath comprises at least about 95% by weight of a potassium composition that delivers potassium ions to the alkali aluminosilicate glass article.

31. The method of claim 30, wherein the second ion exchange bath comprises from about 98% to about 99.5% by weight of the potassium composition.

32. The method of claim 30, wherein the second ion exchange bath comprises 0-2% by weight of a sodium composition.

33. The method of claim 21, wherein the temperature of the second ion exchange step is 360° C. or greater.

34. The method of claim 21, wherein the strengthened glass article has a compressive stress of at least 700 MPa after the second ion exchange step.

35. The method of claim 34, wherein the strengthened glass article has a compressive stress of 700 to about 1000 MPa after the second ion exchange step.

36. The method of claim 21, wherein the compressive stress layer has a depth of 70 μm to 85 μm after the first ion exchange step.

37. The method of claim 21, wherein the DOL is in a range from 70 μm to 100 μm after the second ion exchange step.

38. A strengthened glass article comprising:
a thickness t≤1 mm,
an inner region under a central tension CT, and
at least one compressive stress layer adjacent the inner region and extending within the strengthened glass article from a surface of the strengthened glass article to a depth of layer DOL, wherein the DOL is greater than or equal to 70 μm,
wherein strengthened glass article is under a compressive stress at the surface CSs,
wherein the strengthened glass article is an alkali aluminosilicate glass article comprising 0mol % $Li_2O$, at least 3 mol % $Al_2O_3$, and at least 5 mol % $Na_2O$, and
wherein the strengthened glass article has a stress profile such that a compressive stress CSD at an intermediate critical depth of 50 μm below the surface of the strengthened glass article is at least 10% of a compressive stress at the surface CSs, and the CT≤150 MPa.

39. The strengthened glass article of claim 38, wherein the CSs>300 MPa.

40. The strengthened glass article of claim 38, wherein the CSs/DOL ratio is in a range from 3 MPa/μm to 12 MPa/μm.

41. The strengthened glass article of claim 38, wherein the CSs≥350 MPa.

42. The strengthened glass article of claim 38, wherein the thickness t≤0.9 mm.

43. The strengthened glass article of claim 38, wherein the DOL is in a range from 0.1t to 0.3t, where DOL is expressed in mm.

44. The strengthened glass article of claim 38, wherein the strengthened glass has at least a 60% survival rate when dropped in a drop test from a height of at least 100 cm onto a drop surface comprising 180 grit alumina sandpaper utilizing a uniform drop rate procedure, wherein the survival rate is based on testing at least 5 samples.

45. The strengthened glass of claim 44, wherein the strengthened glass is incorporated into an electronic device.

46. The strengthened glass article of claim 45, wherein CSD is at least 50 MPa.

47. A strengthened glass, the strengthened glass comprising:
a thickness t≤1 mm,
an inner region under a central tension CT, and
at least one compressive stress layer under a compressive stress CS, the compressive stress layer extending from a surface of the glass to a depth of compression, p1 wherein the strengthened glass article has a stress profile such that a compressive stress CSD at an intermediate critical depth of 50 μm below the surface of the strengthened glass article is at least 10% of a compressive stress at the surface CSs,
wherein the strengthened glass comprises 0 mol % $Li_2O$, and
wherein the strengthened glass has at least a 60% survival rate when dropped in a drop test from a height of at least 100 cm onto a drop surface comprising 180 grit alumina sandpaper utilizing a uniform drop rate procedure, wherein the survival rate is based on testing at least 5 samples.

48. The strengthened glass of claim 47, wherein the strengthened glass is incorporated into an electronic device.

49. The strengthened glass of claim 47, wherein the strengthened glass a 60% probability of withstanding fracture when the strengthened glass contacts the drop surface at a flat angle, at a non-flat angle, or both.

50. The strengthened glass of claim 49, wherein the non-flat angle is 30° relative to the drop surface.

\* \* \* \* \*

UNITED STATES PATENT AND TRADEMARK OFFICE
CERTIFICATE OF CORRECTION

PATENT NO. : 11,079,309 B2
APPLICATION NO. : 14/340670
DATED : August 3, 2021
INVENTOR(S) : Laurence Ralph Morey et al.

It is certified that error appears in the above-identified patent and that said Letters Patent is hereby corrected as shown below:

On the Title Page

On page 5, in Column 1, item (56), Other Publications, Line 8, delete "a-Al2O3" and insert -- a-$Al_2O_3$ --, therefor.

On page 5, in Column 1, item (56), Other Publications, Line 15, delete "Al2O3" and insert -- $Al_2O_3$ --, therefor.

On page 5, in Column 1, item (56), Other Publications, Line 18, delete "Opinoin" and insert -- Opinion --, therefor.

On page 5, in Column 2, item (56), Other Publications, Line 62, delete "Li2O-Al2O3-SiO2" and insert -- $Li_2O$-$Al_2O_3$-$SiO_2$ --, therefor.

On page 6, in Column 1, item (56), Other Publications, Line 2, delete "Non-Crystallin" and insert -- Non-Crystalline --, therefor.

On page 6, in Column 1, item (56), Other Publications, Line 16, delete "vurbature" and insert -- curvature --, therefor.

On page 6, in Column 1, item (56), Other Publications, Line 16, delete "Materias," and insert -- Materials, --, therefor.

On page 6, in Column 2, item (56), Other Publications, Lines 17-18, delete "crystallizationof" and insert -- crystallization of --, therefor.

In the Claims

In Column 20, Line 7 (approx.), Claim 1, delete "CSs," and insert -- $CS_s$, --, therefor.

Signed and Sealed this
Third Day of May, 2022

Katherine Kelly Vidal
*Director of the United States Patent and Trademark Office*

CERTIFICATE OF CORRECTION (continued)
U.S. Pat. No. 11,079,309 B2

In Column 20, Line 10 (approx.), Claim 1, delete "Li2O," and insert -- $Li_2O$, --, therefor.

In Column 20, Line 11 (approx.), Claim 1, delete "Al2O3," and insert -- $Al_2O_3$, --, therefor.

In Column 20, Line 13 (approx.), Claim 1, delete "CSD" and insert -- $CS_D$ --, therefor.

In Column 20, Line 15 (approx.), Claim 1, delete "CSs." and insert -- $CS_s$. --, therefor.

In Column 20, Line 17 (approx.), Claim 2, delete "CSs>300" and insert -- $CS_s>300$ --, therefor.

In Column 20, Line 19 (approx.), Claim 3, delete "K2O." and insert -- $K_2O$. --, therefor.

In Column 20, Line 22, Claim 5, delete "CSD" and insert -- $CS_D$ --, therefor.

In Column 20, Line 26, Claim 6, delete "Na2O." and insert -- $Na_2O$. --, therefor.

In Column 20, Line 31, Claim 8, delete "CSs/DOL" and insert -- $CS_s/DOL$ --, therefor.

In Column 20, Line 37, Claim 11, delete "CSs" and insert -- $CS_s$ --, therefor.

In Column 20, Line 43, Claim 14, delete "CSs/DOL" and insert -- $CS_s/DOL$ --, therefor.

In Column 20, Line 45, Claim 15, delete "CSs/DOL" and insert -- $CS_s/DOL$ --, therefor.

In Column 20, Line 52, Claim 16, delete "r1" and insert -- $r_1$ --, therefor.

In Column 20, Line 55, Claim 16, delete "r2" and insert -- $r_2$ --, therefor.

In Column 20, Line 57, Claim 16, delete "r1≥2r2." and insert -- $r_1 \geq 2r_2$. --, therefor.

In Column 20, Line 59, Claim 17, delete "CSs≥350" and insert -- $CS_s \geq 350$ --, therefor.

In Column 20, Line 63, Claim 18, delete "grip" and insert -- grit --, therefor.

In Column 21, Line 2, Claim 20, delete "CSs/DOL" and insert -- $CS_s/DOL$ --, therefor.

In Column 21, Line 7, Claim 21, delete "great" and insert -- greater --, therefor.

In Column 21, Line 18, Claim 21, delete "having DOL," and insert -- having the DOL, --, therefor.

In Column 21, Line 18, Claim 21, delete "CSs," and insert -- $CS_s$, --, therefor.

In Column 21, Line 40, Claim 27, after "compressive stress" insert -- CS --.

In Column 22, Line 12, Claim 38, after "wherein" insert -- the --.

CERTIFICATE OF CORRECTION (continued)
U.S. Pat. No. 11,079,309 B2

In Column 22, Line 13, Claim 38, delete "CSs," and insert -- $CS_s$, --, therefor.

In Column 22, Line 15, Claim 38, delete "0mol %" and insert -- 0 mol % --, therefor.

In Column 22, Line 15, Claim 38, delete "Li2O," and insert -- $Li_2O$, --, therefor.

In Column 22, Line 16, Claim 38, delete "Al2O3," and insert -- $Al_2O_3$, --, therefor.

In Column 22, Line 16, Claim 38, delete "Na2O," and insert -- $Na_2O$, --, therefor.

In Column 22, Line 19, Claim 38, delete "CSD" and insert -- $CS_D$ --, therefor.

In Column 22, Line 22, Claim 38, delete "CSs," and insert -- $CS_s$, --, therefor.

In Column 22, Line 24, Claim 39, delete "CSs>300" and insert -- $CS_s$>300 --, therefor.

In Column 22, Line 26, Claim 40, delete "CSs/DOL" and insert -- $CS_s$/DOL --, therefor.

In Column 22, Line 28, Claim 41, delete "CSs≥350" and insert -- $CS_s$≥350 --, therefor.

In Column 22, Line 42, Claim 46, delete "45," and insert -- 38, --, therefor.

In Column 22, Line 43, Claim 46, delete "CSD" and insert -- $CS_D$ --, therefor.

In Column 22, Lines 44-45, Claim 47, delete "glass, the strengthened glass comprising:" and insert -- glass comprising: --, therefor.

In Column 22, Line 50, Claim 47, after "compression," delete "p1".

In Column 22, Line 52, Claim 47, delete "CSD" and insert -- $CS_D$ --, therefor.

In Column 22, Line 55, Claim 47, delete "CSs," and insert -- $CS_s$, --, therefor.

In Column 22, Line 56, Claim 47, delete "Li2O," and insert -- $Li_2O$, --, therefor.

In Column 22, Line 67, Claim 49, delete "glass a" and insert -- glass has a --, therefor.